(12) United States Patent
Suzuta et al.

(10) Patent No.: US 9,306,196 B2
(45) Date of Patent: Apr. 5, 2016

(54) PACKAGING MATERIAL FOR LITHIUM ION BATTERY, LITHIUM ION BATTERY, AND METHOD FOR MANUFACTURING LITHIUM ION BATTERY

(71) Applicant: TOPPAN PRINTING CO., LTD., Tokyo (JP)

(72) Inventors: Masayoshi Suzuta, Tokyo (JP); Tomoaki Taniguchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 208 days.

(21) Appl. No.: 14/075,208

(22) Filed: Nov. 8, 2013

(65) Prior Publication Data

US 2014/0072864 A1 Mar. 13, 2014

Related U.S. Application Data

(63) Continuation of application No. PCT/JP2012/062174, filed on May 11, 2012.

(30) Foreign Application Priority Data

May 11, 2011 (JP) ................................ 2011-106121

(51) Int. Cl.
| | |
|---|---|
| H01M 2/02 | (2006.01) |
| H01M 2/08 | (2006.01) |
| B32B 15/08 | (2006.01) |
| H01M 10/04 | (2006.01) |
| H01M 10/052 | (2010.01) |
| B32B 7/12 | (2006.01) |
| B32B 15/20 | (2006.01) |
| B32B 27/08 | (2006.01) |
| B32B 27/20 | (2006.01) |
| B32B 27/34 | (2006.01) |
| B32B 27/36 | (2006.01) |

(52) U.S. Cl.
CPC ............... *H01M 2/0287* (2013.01); *B32B 7/12* (2013.01); *B32B 15/08* (2013.01); *B32B 15/20* (2013.01); *B32B 27/08* (2013.01); *B32B 27/20* (2013.01); *B32B 27/34* (2013.01); *B32B 27/36* (2013.01); *B32B 27/365* (2013.01); *H01M 2/026* (2013.01); *H01M 2/0212* (2013.01); *H01M 2/0237* (2013.01); *H01M 2/0262* (2013.01); *H01M 2/0275* (2013.01); *H01M 2/08* (2013.01); *H01M 10/04* (2013.01); *H01M 10/052* (2013.01); *B32B 2307/21* (2013.01); *B32B 2307/51* (2013.01); *B32B 2307/518* (2013.01); *B32B 2307/54* (2013.01); *B32B 2307/714* (2013.01); *B32B 2307/746* (2013.01); *B32B 2457/10* (2013.01); *H01M 2/0277* (2013.01); *H01M 2220/20* (2013.01); *Y02E 60/122* (2013.01); *Y02P 70/54* (2015.11); *Y10T 29/4911* (2015.01)

(58) Field of Classification Search
CPC .......................... H01M 2/0287; H01M 2/0277
USPC ................................................... 429/177, 176
See application file for complete search history.

(56) References Cited

U.S. PATENT DOCUMENTS

4,753,845 A 6/1988 Sumi et al.

FOREIGN PATENT DOCUMENTS

| | | |
|---|---|---|
| CN | 1422741 A | 6/2003 |
| EP | 1 981 099 A2 | 10/2008 |
| JP | 62-208344 | 9/1987 |
| JP | 2001-301090 | 10/2001 |
| JP | 2002-343314 | 11/2002 |
| JP | 3567229 | 9/2004 |
| JP | 2006-228653 | 8/2006 |
| JP | 4559547 | 10/2010 |
| JP | 2011-76735 | 4/2011 |
| WO | WO 2011/016506 A1 | 2/2011 |

OTHER PUBLICATIONS

Extended and Supplementary European Search Report dated Oct. 20, 2014 in corresponding European Patent Application No. 12782939.8.

International Search Report mailed Aug. 7, 2012, in corresponding International Application No. PCT/JP2012/062174.

Chinese Search Report mailed Apr. 23, 2015 in Chinese Patent Application No. 201280022193.X.

*Primary Examiner* — Ladan Mohaddes

(57) ABSTRACT

A packaging material for a lithium ion battery includes: a base material layer that is formed from a film obtained by biaxially stretching a multi-layered coextruded film including a first thermoplastic resin layer having rigidity and chemical resistance and being disposed at an outer side thereof, a second thermoplastic resin layer having a capability of propagating stress and adhesiveness, and a third thermoplastic resin layer having toughness; a metal foil layer that is laminated on one surface of the base material layer; an anti-corrosion-treated layer that is laminated on the metal foil layer; an inner adhesive layer that is laminated on the anti-corrosion-treated layer; and a sealant layer that is laminated on the inner adhesive layer.

5 Claims, 3 Drawing Sheets

PACKAGING MATERIAL FOR LITHIUM ION BATTERY, LITHIUM ION BATTERY, AND METHOD FOR MANUFACTURING LITHIUM ION BATTERY

CROSS REFERENCE TO RELATED APPLICATIONS

This application is a continuation application based on a PCT Patent Application No. PCT/JP2012/062174, filed May 11, 2012, whose priority is claimed on Japanese Patent Application No. 2011-106121, filed May 11, 2011, the contents of which are hereby incorporated by reference in their entirety.

BACKGROUND OF THE INVENTION

1. Field of the Invention

The present invention relates to a packaging material for a lithium ion battery, a lithium ion battery, and a method for manufacturing a lithium ion battery.

2. Description of the Related Art

As a secondary battery for consumer use which is used in a PC, a portable terminal device such as a cellular phone, a video camera, and the like, a lithium ion battery which has high energy and is capable of being made slimmer and more compact has been actively developed. As a packaging material for a lithium ion battery (hereinafter, may be simply referred to as "packaging material"), a deep-drawn molded product, which is obtained by deep drawing a multi-layer laminated film (for example, a configuration such as a heat-resistant base material layer/an aluminum foil layer/a sealant (heat-fusible film)) by cold molding (deep drawing), is used in place of a metal can of the related art with an advantage that weight is light and a battery shape may be freely selected. In addition, with the advantages that the packaging material using the laminated film has a degree of freedom in battery shape, light weight, and high heat dissipation, and is cheaper, the packaging material has been attempted to be applied to batteries for recently developed hybrid cars and electric vehicles in which environmental load is less.

In the lithium ion battery using the laminated film type packaging material, an electrolyte layer which is formed from an electrolytic solution obtained by dissolving a lithium salt in an aprotic solvent (propylene carbonate, ethylene carbonate, dimethyl carbonate, diethyl carbonate, ethyl methyl carbonate, or the like), or a polymer gel to which the electrolytic solution is impregnated is accommodated in the deep drawn molded product together with a positive electrode material, a negative electrode material, and a separator as main-body portions of the battery. Then, the deep drawn product is heat-sealed by heat sealing.

The electrolytic solution has high permeability with respect to the sealant layer. Therefore, the permeated electrolytic solution decreases laminate strength between the aluminum foil layer and the sealant layer, and ultimately, the electrolytic solution may be leaked in some cases. In addition, lithium salts such as $LiPF_6$ and $LiBF_4$ that are electrolytes generate hydrofluoric acid by hydrolysis reaction, and thus corrosion of a metal surface and a decrease in laminate strength between respective layers of the laminated film are caused. Therefore, it is necessary for the packaging material to have a performance capable of preventing corrosion against the electrolytic solution or the hydrofluoric acid.

As a method for providing performance capable of preventing corrosion against the electrolytic solution or the hydrofluoric acid, a method in which a chromate treatment using hexavalent chromium is carried out with respect to an aluminum foil surface is known. However, as can be seen in Rohs restriction or REACH restriction in Europe, hexavalent chromium is treated as an environmentally harmful material, and thus a chromate treatment using trivalent chromium is carried out. However, since hexavalent chromium is used as a starting material to obtain trivalent chromium, total abolition of chromium may be enforced in the future. Particularly, in consideration of the application to electric vehicles considering an effect on the environment, it is important to provide performance capable of preventing corrosion against the electrolytic solution or the hydrofluoric acid by a treatment not using a chromium component at all.

On the other hand, excellent moldability is required for the packaging material. That is, an energy density is determined by the number of cells and amount of electrolytic solution that can be accommodated in the lithium ion battery. Accordingly, during molding of the packaging material into a battery shape, it is necessary to make the molding depth deep so as to increase an accommodated number of cells and amount of electrolytic solution.

Generally, the molding of the packaging material is carried out by cold molding (deep drawing molding) using a mold. However, at this time, when the molding depth is too deep, cracking or a pinhole occurs at a stretched portion of the molding, and thus reliability as a battery disappears. Therefore, it is important to make the molding depth deep without deteriorating reliability.

Particularly, in large-scale application for electric vehicles and the like, it is desired to further increase the energy density from an aspect of a battery performance of taking out a large current. On the other hand, excellent reliability and long-term storage stability are also required at the same time.

In addition, it is necessary for the above-described heat-resistant base material layer to have excellent chemical resistance and scratch resistance. As the base material layer, a polyamide film is frequently used in consideration of moldability. However, the polyamide film is dissolved in an electrolytic solution containing a lithium salt. Therefore, when the electrolytic solution adheres to the base material layer of the packaging material by accident during manufacturing of the battery, the polyamide film is corroded, and thus this corrosion has an effect on a battery manufacturing yield rate. In addition, in a use for electric vehicles, an assembled battery in which a plurality of battery cells are integrated is used to increase output. In the assembled battery, there is a concern that adjacent battery cells may scratch each other due to vibration during vehicle driving, and thus the base material layer may be damaged. Furthermore, when the electrolytic solution is leaked due to an effect of the damage, the electrolytic solution adheres to another battery cell, and thus the assembled battery may be extensively damaged.

Therefore, as a packaging material in which electrical solution resistance and scratch resistance are provided to the surface of the base material layer, a packaging material having the following structure is known.

(1) A packaging material in which a first base material film layer, a second base material film layer, a metal foil layer, and a heat-adhesive resin layer are laminated in this order from the outside is known (Japanese Patent No. 4559547 ((hereinafter, Patent Document 1)). In the packaging material, the first base material film layer is made of a biaxially stretched polyethylene terephthalate film (hereinafter, referred to as a "biaxially stretched PET film"), and the second base material film layer is made of a biaxially stretched nylon film (hereinafter, referred to as a "biaxially stretched Ny film") (Patent Document 1). The packaging material has a structure in which the biaxially stretched PET film having low hygroscopicity, rigidity, scratch resistance, and heat resistance, and the biaxially stretched Ny film having flexibility, pricking strength, bending strength, and low-temperature resistance are bonded to each other by a known dry laminate method using a two-liquid curing type polyurethane-based adhesive and the like. The packaging material having this structure also has the characteristics of the above-described film.

(2) A packaging material in which a coating layer formed from a specific resin such as polyvinylidene chloride and polyvinylidene chloride-vinyl chloride copolymer is formed on a surface side of a stretched film on which a base material layer is formed is known (Japanese Patent No. 3567229 (hereinafeter, Patent Document 2)). The stretched film is protected by the coating layer.

However, in the packaging materials (1) and (2), a portion stretched by molding has a tendency to return to its original shape, and thus the molding depth substantially decreases, or a shape varies in some cases.

SUMMARY OF THE INVENTION

An object of the invention is to provide a packaging material for a lithium ion battery which has excellent moldability, a performance capable of maintaining a shape after molding, electrolytic solution resistance, and scratch resistance, a lithium ion battery using the packaging material for a lithium ion battery, and a method for manufacturing a lithium ion battery.

The invention employs the following configurations to solve the problem.

According to a first aspect of the invention, a packaging material for a lithium ion battery is provided. The packaging material includes: a base material layer that is formed from a film obtained by biaxially stretching a multi-layered coextruded film including a first thermoplastic resin layer having rigidity and chemical resistance and being disposed at an outer side thereof, a second thermoplastic resin layer having a capability of propagating stress and adhesiveness, and a third thermoplastic resin layer having toughness; a metal foil layer that is laminated on one surface of the base material layer; an anti-corrosion-treated layer that is laminated on the metal foil layer; an inner adhesive layer that is laminated on the anti-corrosion-treated layer; and a sealant layer that is laminated on the inner adhesive layer.

In the packaging material for a lithium ion battery according to the first aspect of the invention, the thickness of the first thermoplastic resin layer may be 1 μm to 10 μm, the thickness of the second thermoplastic resin layer may be 0.1 μm to 5 μm, and the thickness of the third thermoplastic resin layer may be 10 μm to 50 μm.

In the packaging material for a lithium ion battery according to the first aspect of the invention, the first thermoplastic resin layer may be a layer containing an aromatic polyester resin, the second thermoplastic resin layer may be a layer containing a modified thermoplastic resin that is graft-modified with one or more unsaturated carboxylic acid derivative components selected from the group consisting of unsaturated carboxylic acid, acid anhydride of the unsaturated carboxylic acid, and ester of the unsaturated carboxylic acid, and the third thermoplastic resin layer may be a layer containing a polyamide resin.

In the packaging material for a lithium ion battery according to the first aspect of the invention, the first thermoplastic resin layer may be located at a surface layer side of the base material layer.

According to a second aspect of the invention, a lithium ion battery is provided. The lithium ion battery includes: a container body that is formed from the packaging material for a lithium ion battery according to the first aspect; a battery member that is accommodated in the container body so that a part of a tab leads out to the outside; and an electrolytic solution that is accommodated in the container body together with the battery member. The container body has a recess portion that is formed in the packaging material for a lithium ion battery by cold molding. The container body is formed in a container shape in which the sealant layer is disposed inside the container body. An edge portion at which parts of the sealant layer come into contact with each other is heat-sealed in a state in which the battery member and the electrolytic solution are accommodated in the recess portion to seal the battery member and the electrolytic solution.

According to a third aspect of the invention, a method for manufacturing a lithium ion battery is provided. The method includes: preparing the packaging material for a lithium ion battery according to the first aspect; forming a recess portion in the packaging material for a lithium ion battery by cold molding (Y1); accommodating a battery member in the recess portion so that a part of a tab leads out to the outside of the recess portion; forming the packaging material for a lithium ion battery in a container shape, and heat-sealing an edge portion at which parts of the sealant layer come into contact with each other so that an opening is formed at the edge portion (Y2); injecting an electrolytic solution into the recess portion through the opening; and heat-sealing the edge portion to close the opening (Y3).

Effects of the Invention

The packaging material for a lithium ion battery according to the first aspect of the invention has excellent moldability, a performance capable of maintaining a shape after molding, electrolytic solution resistance, and scratch resistance.

In addition, the lithium ion battery according to the second aspect of the invention is provided with a container body formed in a predetermined shape using the packaging material for a lithium ion battery, and thus the lithium ion battery has excellent electrolytic solution resistance and scratch resistance.

In addition, according to the method for manufacturing a lithium ion battery according to the third aspect of the invention, the packaging material for a lithium ion battery is molded into a predetermined shape to form a container body, and thus a lithium ion battery excellent in electrolytic solution resistance and scratch resistance may be manufactured.

DETAILED DESCRIPTION OF THE INVENTION

<Packaging Material for Lithium Ion Battery>

Hereinafter, an example of an embodiment of a packaging material for a lithium ion battery of the invention will be described in detail.

Figure 1:
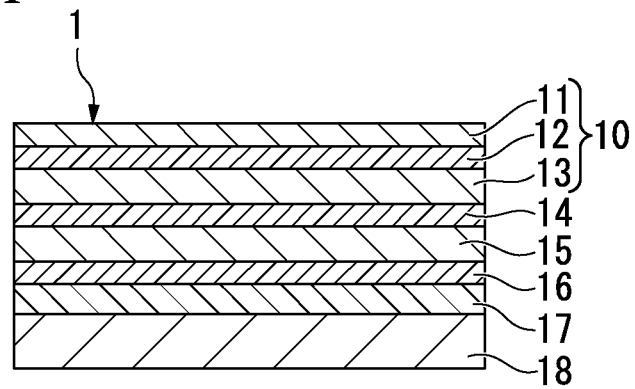
FIG. 1 is a cross-sectional view illustrating an example of a packaging material for a lithium ion battery according to an embodiment of the invention.

As shown in FIG. 1, the packaging material 1 for a lithium ion battery (hereinafter, referred to as an "packaging material 1") is a laminated body in which an outer adhesive layer 14, a metal foil layer 15, an anti-corrosion-treated layer 16, an inner adhesive layer 17, and a sealant layer 18 are sequentially laminated on one surface side (one surface) of a base material layer 10. In the packaging material 1, the base material layer 10 is used as the outermost layer, and the sealant layer 18 is used as the innermost layer.

[Base Material Layer 10]

The base material layer 10 is a layer that is formed from a film (hereinafter, referred to as a "film (A)") obtained by biaxially stretching a multi-layered coextruded film including a thermoplastic resin layer (a) 11 (first thermoplastic resin layer) which has rigidity and chemical resistance and is disposed at an outer side, a thermoplastic resin layer (b) 12 (second thermoplastic resin layer) having a capability of propagating stress and adhesiveness, and a thermoplastic resin layer (c) 13 (third thermoplastic resin layer) having toughness. Since the base material layer 10 is formed from the film (A), the packaging material 1 becomes excellent in moldability, and obtains a performance capable of maintaining a shape after molding, electrolytic solution resistance, and scratch resistance.

(Thermoplastic Resin Layer (a) 11)

The thermoplastic resin layer (a) 11 plays a role in suppressing generation of a pinhole which may occur during handling or distribution by providing heat resistance in a sealing process of the packaging material 1 during manufacturing of the lithium ion battery. In addition, the thermoplastic resin layer (a) 11 provides electrolytic solution resistance, and suppresses occurrence of failure in external appearance due to adherence of an electrolytic solution in an electrolytic solution injection process during manufacturing of the lithium ion battery.

As the thermoplastic resin layer (a) 11, a layer containing an aromatic polyester resin is preferable. In the case of the aromatic polyester resin, rigidity and chemical resistance necessary for the thermoplastic resin layer (a) are satisfied. Examples of the aromatic polyester resin include a polyester resin obtained by polymerizing or copolymerizing one or more kinds of aromatic dibasic acids and one or more kinds of diols.

Examples of the aromatic dibasic acid include isophthalic acid, terephthalic acid, naphthalene dicarboxylic acid, and the like.

Examples of the diol include aliphatic diols such as ethylene glycol, propylene glycol, butanediol, neopentyl glycol, methyl pentanediol, hexanediol, heptanediol, octanediol, nonane diol, decane diol, dodecane diol; alicyclic diols such as cyclohexane diol, and hydrogenated xylylene glycol; aromatic diols such as xylylene glycol; and the like.

The aromatic polyester resin may be a resin in which one or more kinds of aliphatic dibasic acids are copolymerized. Examples of the aliphatic dibasic acid include succinic acid, glutaric acid, adipic acid, pimelic acid, suberic acid, azelaic acid, sebacic acid, brassylic acid, and the like.

Specific examples of the aromatic polyester resin include polyethylene terephthalate (PET), polybutylene terephthalate (PBT), polyethylene naphthalate (PEN), and the like. Among these, polyethylene terephthalate is preferable.

The thermoplastic resin layer (a) 11 may be a layer containing polycarbonate resin or a fluorine-based resin. In the case of the polycarbonate resin or the fluorine-based resin, the requirement of rigidity and chemical resistance for the thermoplastic resin layer (a) is satisfied.

As a soft component, an ethylene-based copolymer resin obtained by copolymerizing maleic anhydride, or an aliphatic polyester resin may be mixed in the thermoplastic resin layer (a) 11. According to this, further excellent moldability may be obtained.

Examples of the ethylene-based copolymer resin in which maleic anhydride is copolymerized include ethylene-α, β unsaturated carboxylic acid alkyl ester-maleic anhydride copolymer. Examples of the α, β unsaturated carboxylic acid alkyl ester include materials obtained by esterifying the α, β unsaturated carboxylic acid with an alcohol having an alkyl group having 1 to 4 carbon atoms. Examples of the α, β unsaturated carboxylic acid include monocarboxylic acid or dicarboxylic acid having 3 to 8 carbon atoms, or a metal salt or acid anhydride thereof. Specific examples thereof include acrylic acid, methacrylic acid, maleic acid, fumaric acid, itaconic acid, maleic anhydride, and the like, and as a commercially available product, REXPEARL manufactured by Japan Polyethylene Corporation, and the like may be exemplified.

Examples of the aliphatic polyester resin include polycaprolactone, and the like, and as a commercially available product, Placcel manufactured by Daicel Corporation, and the like may be exemplified.

In addition, various rubber components such as various polyester elastomers, olefin-based elastomers, and polyamide-based elastomers may be mixed in the thermoplastic resin layer (a) 11 to obtain other modification effects.

In addition, various additives such as a lubricant, an anti-static agent, an anti-blocking agent, and inorganic fine particles may be added to the thermoplastic resin layer (a) 11 as necessary.

From the viewpoint of obtaining excellent electrolytic solution resistance, scratch resistance, and heat resistance, the thickness of the thermoplastic resin layer (a) 11 is preferably 1 µm or more, and more preferably 3 µm or more. In addition, the thickness of the thermoplastic resin layer (a) 11 is preferably 10 µm or less, and more preferably 7 µm or less considering that moldability is excellent and a performance capable of maintaining a shape after molding is excellent.

(Thermoplastic Resin Layer (b) 12)

As the thermoplastic resin layer (b) 12, a layer which contains a modified thermoplastic resin that is graft-modified with one or more unsaturated carboxylic acid derivative components selected from the group consisting of unsaturated carboxylic acid, acid anhydride of the unsaturated carboxylic acid, and ester of the unsaturated carboxylic acid is preferable. In the case of the modified thermoplastic resin, the requirement of a capability of propagating stress and adhesiveness for the thermoplastic resin layer (b) is satisfied. Since the modified thermoplastic resin is a hard material having rigidity higher than that of a two-liquid curable type polyurethane-based adhesive, stress may be allowed to efficiently propagate during molding.

As the modified thermoplastic resin, in consideration of having excellent capability of propagating stress and adhesiveness, a resin that is obtained by modifying a polyolefin-based resin, a styrene-based elastomer, and a polyester-based elastomer with the unsaturated carboxylic acid derivative component is preferable. Hereinafter, the polyolefin-based resin that is graft-modified with the unsaturated carboxylic acid derivative component is referred to as an acid-modified polyolefin-based resin, the styrene-based elastomer resin that is graft-modified with the unsaturated carboxylic acid derivative component is referred to as an acid-modified styrene-based elastomer resin, and the polyester-based elastomer resin that is graft-modified with the unsaturated carboxylic acid derivative component is referred to as an acid-modified polyester-based elastomer resin.

Examples of the polyolefin-based resin in the acid-modified polyolefin-based resin include low density polyethylene, medium density polyethylene, high density polyethylene; an ethylene-α olefin copolymer; homo, block, or random polypropylene; a propylene-α olefin copolymer; a copolymer obtained by copolymerizing polar molecules such as acrylic acid and methacrylic acid in the above-described materials; a polymer such as a cross-linked polyolefin; and the like. The polyolefin-based resins may be used alone, or in combination of two or more kinds thereof.

Examples of the styrene-based elastomer in the acid-modified styrene-based elastomer resin include a copolymer of styrene (hard segment), and butadiene, isoprene, or hydrogenated product thereof (soft segment), and the like.

Examples of the polyester-based elastomer in the acid-modified polyester-based elastomer resin include a copolymer of crystalline polyester (hard segment) and polyalkylene ether glycol (soft segment), and the like.

Examples of the unsaturated carboxylic acid include acrylic acid, methacrylic acid, maleic acid, fumaric acid, itaconic acid, citraconic acid, tetrahydrophthalic acid, bicyclo[2,2,1]hept-2-ene-5,6-dicarboxylic acid, and the like.

Examples of the acid anhydride of the unsaturated carboxylic acid include maleic anhydride, itaconic anhydride, citraconic anhydride, tetrahydrophthalic anhydride, bicyclo[2,2,1]hept-2-ene-5,6-dicarboxylic anhydride, and the like.

Examples of the ester of the unsaturated carboxylic acid include ester of unsaturated carboxylic acid such as methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalic anhydride, and dimethyl bicyclo[2,2,1]hept-2-ene-5,6-dicarboxylate.

The modified thermoplastic resin may be obtained by allowing 0.2 parts by mass to 100 parts by mass of the unsaturated carboxylic acid derivative component to react with 100 parts by mass of a thermoplastic resin as a base under the presence of a radical initiator while being heated.

A reaction temperature is preferably 50° C. to 250° C., and more preferably 60° C. to 200° C. A reaction time is also determined depending on a manufacturing method, but in a case of a melting graft reaction by a biaxial extruder, the reaction time is preferably 2 minutes to 30 minutes, which is within a residence time of the extruder, and more preferably 5 minutes to 10 minutes. In addition, the modification reaction may be carried out under any condition of ordinary pressure or compressed pressure.

As the radical initiator that is used in the modification reaction, organic peroxide may be exemplified. As the organic peroxide, various materials may be selected according to a temperature condition and a reaction time. Examples of the organic peroxide include alkyl peroxide, aryl peroxide, acyl peroxide, ketone peroxide, peroxy ketal, peroxycarbonate, peroxy ester, hydroperoxide, and the like. In the case of the melting graft reaction by the biaxial extruder, alkyl peroxide, peroxy ketal, peroxy ester are preferable, and di-t-butyl peroxide, 2,5-dimethyl-2,5-di-t-butylperoxy-hexyne-3, and dicumyl peroxide are more preferable.

As the acid-modified polyolefin-based resin, a polyolefin-based resin that is modified with maleic anhydride is a representative resin, and Admer manufactured by Mitsui Chemicals, Inc., MODIC manufactured by Mitsubishi Chemical Corporation, ADTEX manufactured by Japan Polyethylene Corporation, and the like may be exemplified.

As the acid-modified styrene-based elastomer, TOUGH-TEK manufactured by AK elastomer, Kraton manufactured by Kraton Performance Polymers Inc., and the like may be exemplified.

As the acid-modified polyester elastomer, primalloy manufactured by Mitsubishi Chemical Corporation may be exemplified.

In addition, various additives such as a lubricant, an anti-static agent, an anti-blocking agent, and inorganic fine particles may be added to the thermoplastic resin layer (b) 12 as necessary.

The thickness of the thermoplastic resin layer (b) 12 is preferably 0.1 µm or more, and more preferably 0.5 µm or more considering that the adhesiveness between the thermoplastic resin layer (a) 11 and the thermoplastic resin layer (c) 13 increases. In addition, the thickness of the thermoplastic resin layer (b) 12 is preferably 5 µm or less, and more preferably 3 µm or less considering that a capability of propagating stress and moldability are improved.

(Thermoplastic Resin Layer (c) 13)

The thermoplastic resin layer (c) 13 plays a role in improving moldability of the packaging material 1 by providing toughness thereto. In addition, the thermoplastic resin layer (c) also provides flexibility, pricking resistance, and low temperature resistance.

As the thermoplastic resin layer (c) 13, a layer containing a polyamide resin is preferable. In the case of the polyamide resin, the requirement for toughness for the thermoplastic resin layer (c) is satisfied.

Examples of the polyamide resin include Poly ϵ-Kapuramido (nylon 6), polyhexamethylene adipamide (nylon 66), polyhexamethylene sebacamide (nylon 610), polyamino undecano amide (nylon 11), polylauryl amide (nylon 12), polymetaxylylene diadipamide (MXD6), copolymers thereof, and the like. Among these, nylon 6 and nylon 66 are preferable.

The ethylene-based copolymer resin obtained by copolymerizing maleic anhydride or an aliphatic polyester resin which is mentioned in the thermoplastic resin layer (a) 11 may be mixed in the thermoplastic resin layer (c) 13. According to this, further excellent moldability may be obtained. In addition, various rubber components such as various polyester elastomers, olefin-based elastomers, and polyamide-based elastomers may be mixed in the thermoplastic resin layer (c) 13 to obtain other modification effects.

In addition, various additives such as a lubricant, an anti-static agent, an anti-blocking agent, and inorganic fine particles may be added to the thermoplastic resin layer (c) 13 as necessary.

The thickness of the thermoplastic resin layer (c) 13 is preferably 10 µm or more, and more preferably 15 µm or more from the viewpoint that excellent moldability may be obtained. In addition, when considering economic efficiency and the thickness of a laminated material required in the lithium ion battery market, the thickness of the thermoplastic resin layer (c) 13 is preferably 50 µm or less, and more preferably 35 µm or less.

In the structure of the packaging material 1, the base material layer 10 is configured to have a film (A) obtained by biaxially stretching a multi-layered coextruded film having the thermoplastic resin layer (a) 11 that is disposed at an outer side thereof, the thermoplastic resin layer (b) 12, and the thermoplastic resin layer (c) 13. Accordingly, excellent moldability, performance capable of maintaining a shape after molding, electrolytic solution resistance, and scratch resistance may be obtained. The main causes of obtaining these effects are considered as follows.

In cold molding, it is important for a packaging material after molding not to return to its original shape so as to mold a packaging material in a sufficient deep drawing depth, and thus it is necessary to carry out the deep drawing at a plastic deformation region in which the base material layer and the metal foil layer exceed tensile yield point. However, in the packaging material disclosed in Patent Document 1 in which the biaxially stretched PET film and biaxially stretched Ny film are bonded with an adhesive, it is considered that a stress during molding is absorbed and mitigated by an adhesive layer, and thus molding may be carried out in an elastic deformation region in which the biaxially stretched PET film does not exceed the yield point, or a region near the yield point (a transition region from elastic deformation to plastic deformation). Therefore, a residual stress is accumulated in the biaxially stretched PET film or the biaxially stretched Ny film, and the packaging material after molding is apt to return to its original shape or portions other than the recess portion are apt to be warped. Particularly, the biaxially stretched PET film is not likely to be plastic-deformed compared to the metal foil or the biaxially stretched Ny film, and an effect by an adhesive layer on the capability of propagating stress is large. In addition, the biaxially stretched PET film and the biaxially stretched Ny film that are bonded to each other are prepared separately, and thus stretching conditions thereof are not completely equal to each other, and thus stress characteristics are different from each other. As described above, in a laminated film in which films having different stress characteristics are laminated, nonuniformity in the stress characteristics during molding may have an effect of decreasing the performance capable of maintaining a shape after molding.

On the contrary, since the film (A) of the base material layer 10 of the packaging material 1 is provided with the thermoplastic resin layer (a) 11 at an outer side thereof, excellent electrolytic solution resistance and scratch resistance may be obtained. In addition, since the thermoplastic resin layer (b) 12 having excellent rigidity compared to a polyurethane-based adhesive is provided, absorption and mitigation of the stress, which is applied during molding, between the thermoplastic resin layer (a) 11 and the thermoplastic resin layer (c) 13 are suppressed. In addition, the film (A) is a film obtained by biaxially stretching a multi-layered coextruded film having the thermoplastic resin layers (a) to (c) instead of a film obtained by bonding two sheets of the biaxially stretched films. Accordingly, respective stretching conditions of the thermoplastic resin layers (a) to (c) are provided, and thus stress characteristics are uniform. According to this, the stress applied during molding efficiently propagates through the thermoplastic resin layer (b) 12, and the thermoplastic resin layer (a) 11 and the thermoplastic resin layer (c) 13 are sufficiently deep-drawn in the plastic deformation region. As a result, in addition to excellent modability, an excellent performance capable of maintaining shape may be obtained, thus returning to its original shape of the packaging material 1 after molding, or warpage of portions other than the recess portion of the packaging material 1 are suppressed.

In addition, the film (A) is not limited to the three-layer configuration in which the thermoplastic resin layer (a), the thermoplastic resin layer (b), and the thermoplastic resin layer (c) are formed. For example, the film (A) may be configured of four layers in which the thermoplastic resin layer (a), the thermoplastic resin layer (b), the thermoplastic resin layer (c), and the thermoplastic resin layer (b) are formed from an outer side thereof. In addition, the film (A) may be configured of five layers in which the thermoplastic resin layer (a), the thermoplastic resin layer (b), the thermoplastic resin layer (c), the thermoplastic resin layer (b), and the thermoplastic resin layer (a) are formed.

In the case of the four-layered configuration, an outer adhesive layer is not provided, and the base material layer and the metal foil layer may be bonded using adhesiveness of the thermoplastic resin layer (b) provided at an inner side.

In addition, as long as the film (A) is a film having three layers of the thermoplastic resin layer (a), the thermoplastic resin layer (b), and the thermoplastic resin layer (c), the film (A) may have a resin layer other than the thermoplastic resin layer (a), the thermoplastic resin layer (b), and the thermoplastic resin layer (c) on a metal foil side of the thermoplastic resin layer (c), and the like.

Similar to the example, considering that in the base material layer 10, excellent electrolytic solution resistance and the scratch resistance may be easily obtained, the thermoplastic resin layer (a) 11 is preferably set as the outermost surface layer.

A method for manufacturing the film (A) is not particularly limited, and for example, a melting extrusion method in which a T die, an inflation die, and the like are provided may be exemplified.

For example, in the case of using the T die, components that form the thermoplastic resin layers (a) to (c) are melted, and these molten components are coextruded by the extruder provided with the T die into a film. Then, the molten resins that are formed into a film are quickly cooled on a rotary cooling drum according to a known casting method such as an air knife cast method and a static electricity application cast method to form a film. Then, the non-stretched film that is obtained is preheated using a roller-type vertical stretching machine including heating roller groups in which peripheral speeds are different, and then the non-stretched film is subjected to vertical stretching between a stretching roll that heats the non-stretched film to a glass transition point or higher and a cooling roll that cools the film. Furthermore, the film that is vertically stretched is guided to a tenter, and is preheated to 50° C. to 70° C. and is horizontally stretched at 60° C. to 110° C. According to necessity, a vertical stretching magnification and a horizontal stretching magnification are controlled, and then a heat treatment and a relax treatment at 210° C. to 220° C. are further carried out in the tenter.

The biaxial stretching in the film (A) is not limited to the biaxial stretching in the above-described sequence, and may be simultaneous biaxial stretching. The stretching magnification or a heat-fixing temperature in the film (A) may be appropriately selected.

[Outer Adhesive Layer 14]

The outer adhesive layer 14 is a layer that bonds the base material layer 10 and the metal foil layer 15.

As an adhesive component that constitutes the outer adhesive layer 14, an adhesive for a dry laminate is preferably used. It is more preferable to use a two-liquid curable polyurethane-based adhesive in which a bifunctional isocyanate compound as a curing agent is allowed to act on a main agent such as polyester polyol, polyether polyol, acrylic polyol, carbonate polyol, and polyolefin polyol.

Examples of the polyester polyol include polyol that is obtained by allowing one or more kinds of dibasic acids and one or more kinds of diols to react with each other, and the like.

Examples of the dibasic acid include aliphatic dibasic acids such as succinic acid, glutaric acid, adipic acid, pimelic acid, suberic acid, azelaic acid, sebacic acid, and brasylic acid;

aromatic dibasic acids such as isophthalic acid, terephthalic acid, and naphthalene dicarboxylic acid; and the like.

Examples of the diol include aliphatic diols such as ethylene glycol, propylene glycol, butanediol, neopentyl glycol, methyl pentanediol, hexanediol, heptanediol, octanediol, nonane diol, decane diol, and dodecane diol; alicyclic diols such as cyclohexane diol and hydrogenated xylylene glycol; and aromatic diols such as xylylene glycol.

In addition, as a hydroxyl group at both distal ends of the polyester polyol, polyester urethane polyol, which is chain-elongated using an elementary substance of an isocyanate compound, or an adduct product, a biuret product, or an isocyanurate product which is composed of at least one kind of isocyanate, and the like may be used. Examples of the isocyanate compound include 2,4- or 2,6-tolylene diisocyanate, xylylene diisocyanate, 4,4'-diphenylmethane diisocyanate, methylene diisocyanate, isopropylidene diisocyanate, lysine diisocyanate, 2,2,4- or 2,4,4-trimethyl hexamethylene diisocyanate, 1,6-hexamethylene diisocyanate, methylcyclohexane diisocyanate, isophorone diisocyanate, 4,4'-dicyclohexylmethane diisocyanate, isopropylidene dicyclohexyl-4,4'-diisocyanate, and the like.

Examples of the polyether polyol include ether-based polyol such as polyethylene glycol and polypropylene glycol, and polyether urethane polyol in which the above-described isocyanate compound is allowed to act as a chain extender.

Examples of the acrylic polyol include a copolymer containing poly(meth)acrylic acid as a main component. Examples of a monomer that is used in the copolymer include hydroxyl group-containing monomers such as 2-hydroxyethyl (meth)acrylate and 2-hydroxypropyl (meth)acrylate; alkyl (meth)acrylate-based monomers (examples of an alkyl group include a methyl group, an ethyl group, an n-propyl group, an i-propyl group, an n-butyl group, an i-butyl group, a t-butyl group, a 2-ethylhexyl group, a cyclohexyl group, and the like); amide group-containing monomers such as (meth)acrylamide, N-alkyl (meth)acrylamide, N,N-dialkyl (meth)acrylamide (examples of an alkyl group include a methyl group, an ethyl group, an n-propyl group, an i-propyl group, an n-butyl group, an i-butyl group, a t-butyl group, a 2-ethylhexyl group, a cyclohexyl group, and the like), N-alkoxy (meth)acrylamide, N,N-dialkoxy (meth)acrylamide (examples of an alkoxy group include a methoxy group, an ethoxy group, a butoxy group, an isobutoxy group, and the like), N-methylol (meth)acrylamide, and N-phenyl (meth)acrylamide; glycidyl group-containing monomers such as glycidyl (meth)acrylate and allyl glycidyl ether; silane-containing monomers such as (meth)acryloxypropyltrimethoxysilane, (meth)acryloxypropyltriethoxysilane; isocyanate group-containing monomers such as (meth)acryloxypropyl isocyanate; and the like.

Examples of the carbonate polyol include polyol that is obtained by allowing a carbonate compound and diol to react with each other, and the like. Examples of the carbonate compound include dimethyl carbonate, diphenyl carbonate, ethylene carbonate, and the like. Examples of the diol include diol mentioned in the polyether polyols. In addition, polycarbonate urethane polyol that is chain-elongated by the isocyanate compound may be used.

Examples of the polyolefin polyol include polyol, polybutadiene diol, a hydrogenated product thereof, and the like which are obtained by copolymerizing olefin and a hydroxyl group-containing monomer such as 2-hydroxyethyl (meth)acrylate and 2-hydroxypropyl (meth)acrylate, and by modifying a polyolefin backborn.

The various polyols may be used alone or two or more kinds thereof may be mixed and used according to a function or performance that is required.

Examples of an isocyanate compound of a curing agent include the isocyanate compound mentioned as a chain extender.

After the polyurethane-based adhesive is applied, and then aging is carried out with respect to the polyurethane-based adhesive, for example, at 40° C. for four or more days, reaction between an hydroxyl group of a main agent and an isocyanate group of a curing agent progresses, and thus strong bonding is realized. A molar ratio (NCO/OH) of the isocyanate group of the curing agent to the hydroxyl group of the main agent is preferably 1 to 10, and more preferably 2 to 5.

A carbodiimide compound, an oxazoline compound, an epoxy compound, a phosphorus compound, a silane coupling agent, and the like may be mixed in the outer adhesive layer 14 for promoting adhesion.

Examples of the carbodiimide compound include N,N'-di-o-tolyl carbodiimide, N,N'-diphenyl carbodiimide, N,N'-di-2,6-dimethyl phenyl carbodiimide, N,N'-bis(2,6-diisopropylphenyl) carbodiimide, N,N'-dioctyl decyl carbodiimide, N-triyl-N'-cyclohexyl carbodiimide, N,N'-di-2,2-di-t-butylphenyl carbodiimide, N-triyl-N'-phenyl carbodiimide, N,N'-di-p-nitrophenyl carbodiimide, N,N'-di-p-aminophenyl carbodiimide, N,N'-di-p-hydroxyphenyl carbodiimide, N,N'-di-cyclohexyl carbodiimide, N,N'-di-p-tolyl carbodiimide, and the like.

Examples of the oxazoline compound include monooxazoline compounds such as 2-oxazoline, 2-methyl-2-oxazoline, 2-phenyl-2-oxazoline, 2,5-dimethyl-2-oxazoline, and 2,4-diphenyl-2-oxazoline; and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline), and 2,2'-(1,4-phenylene)-bis(2-oxazoline).

Examples of the epoxy compound include diglycidyl ethers of aliphatic-based diol such as 1,6-hexanediol, neopentyl glycol, and polyalkylene glycol; polyglycidyl ethers of aliphatic polyols such as sorbitol, sorbitan, polyglycerol, pentaerythritol, diglycerol, glycerol, and trimethylol propane; polyglycidyl ethers of cyclic polyols such as cyclohexane dimethanol; diglycidyl esters or polydiglycidyl esters of aliphatic or aromatic polyvalent carboxylic acid such as terephthalic acid, isophthalic acid, naphthalene dicarboxylic acid, trimellitic acid, adipic acid, and sebacic acid; diglycidyl ethers or polydiglycidyl ethers of polyvalent phenols such as resorcinol, bis-(p-hydroxyphenyl) methane, 2,2-bis-(p-hydroxyphenyl) propane, tris-(p-hydroxyphenyl) methane, and 1,1,2,2-tetrakis(p-hydroxyphenyl)ethane; N-glycidyl derivatives of amines such as N,N'-diglycidyl aniline, N,N,N-diglycidyl toluidine, and N,N,N',N'-tetraglycidyl-bis-(p-aminophenyl) methane; triglycidyl derivatives of aminophenol; triglycidyl tris(2-hydroxyethyl) isocyanurate; triglycidyl isocyanurate; ortho-cresol epoxy; and phenol novolak epoxy.

Examples of the phosphorus compound include tris (2,4-di-t-butylphenyl) phosphite, tetrakis(2,4-di-t-butylphenyl)4,4'-biphenylene phosphite, bis(2,4-di-t-butylphenyl)pentaerythritol-di-phosphite, bis(2,6-di-t-butyl-4-methylphenyl) pentaerythritol-di-phosphite, 2,2-methylenebis(4,6-di-t-butylphenyl)octyl phosphite, 4,4'-butylidene-bis(3-methyl-6-t-butylphenyl-di-tridecyl) phosphite, 1,1,3-tris(2-methyl-4-ditridecylphosphite-5-t-butyl-phenyl)butane, tris(mixed mono and dinonylphenyl) phosphite, tris(nonylphenyl) phosphite, 4,4'-isopropylidene bis(phenyl-dialkyl phosphite), and the like.

Examples of the silane coupling agent include vinyltriethoxysilane, vinyltris(β-methoxyethoxy)silane, γ-methacryloxypropyltrimethoxysilane, vinyltriacetoxysilane, γ-glycidoxypropyltrimethoxy silane, γ-glycidoxypropyltriethoxy silane, β-(3,4-epoxy cyclohexyl)ethyltrimethoxysilane, γ-chloropropyltrimethoxysilane, vinyltrichlorosilane, γ-mercaptopropyltrimethoxysilane, γ-aminopropyltriethoxysilane, N-β(aminoethyl)-γ-aminopropyltrimethoxysilane, and the like.

In addition, besides these, various additives or stabilizers may be mixed in the outer adhesive layer 14 according to a performance that is required for an adhesive.

The thickness of the outer adhesive layer 14 is preferably 1 μm to 10 μm considering bonding strength, followability, workability, and the like, and more preferably 3 μm to 7 μm.

Similar to the inner adhesive layer 17 to be described later, an adhesive component that is used in a heat lamination method may be used in the outer adhesive layer 14.

In addition, in a case in which the base material layer 10 is a film having a four-layered configuration of the thermoplastic resin layer (a), the thermoplastic resin layer (b), the thermoplastic resin layer (c), and the thermoplastic resin layer (b) from the outer side thereof, the outer adhesive layer 14 may not be provided.

[Metal Foil Layer 15]

As the metal foil layer 15, various kinds of metal foil of aluminum, stainless steel, and the like may be used, and the aluminum foil is preferable in aspects of a moisture-proof property, workability such as spreadability, and cost. As the aluminum foil, general soft aluminum foil may be used. In the aluminum foil, iron-containing aluminum foil is more preferable considering it is capable of providing pinhole resistance and the spreadability during molding. In this case, the content of iron in the aluminum foil (100% by mass) is preferably 0.1% by mass to 9.0% by mass, and more preferably 0.5% by mass to 2.0% by mass. When the content of iron is equal to or more than the lower limit (0.1% by mass), the pinhole resistance and the spreadability of the aluminum foil are improved. When the content of iron is equal to or less than the upper limit (9.0% by mass), flexibility of the aluminum foil is improved.

It is preferable that the metal foil be subjected to a degreasing treatment in advance. The degreasing treatment is largely classified into a wet type and a dry type.

With regard to the wet-type degreasing treatment, acid degreasing, alkali degreasing, and the like may be exemplified.

With regard to the acid degreasing, a method in which inorganic acids such as sulfuric acid, nitric acid, hydrochloric acid, and hydrofluoric acid are used alone, or two or more kinds thereof are mixed and used, and the like may be exemplified. In addition, according to necessity, various metal salts serving as a supply source of Fe ions, Ce ions, and the like may be mixed in in some cases in consideration of improving an etching effect of the metal foil. With regard to the alkali degreasing, a strong etching type using sodium hydroxide and the like may be exemplified, or a weak alkali system or a surfactant may be mixed in in some cases. The degreasing and etching are carried out by an immersion method or a spraying method.

With regard to the dry-type degreasing treatment, a method in which the degreasing treatment is carried out in an annealing process of aluminum may be exemplified. In addition, a flame treatment, a corona treatment, and the like may be exemplified. In addition, a degreasing treatment in which a contaminant is oxidized, decomposed, and removed by active oxygen generated by irradiation of ultraviolet rays having any specific wavelength may be exemplified.

The degreasing treatment is carried out on a single surface or both surfaces of the aluminum foil.

The thickness of the metal foil layer 15 is preferably 9 μm to 200 μm considering a barrier property, pinhole resistance, and workability, and more preferably 15 μm to 100 μm.

[Anti-Corrosion-Treated Layer 16]

The anti-corrosion-treated layer 16 plays a role in suppressing corrosion of the metal foil layer 15 due to hydrofluoric acid generated due to reaction between an electrolytic solution and moisture, and plays a role in improving adhesivity with the inner adhesive layer 17 by improving interaction with the metal foil layer 15.

Examples of the anti-corrosion-treated layer 16 include a layer that is formed by a degreasing treatment, a hydrothermal modification treatment, an anodic oxidation treatment, a chemical treatment, or a treatment in combination of two or more kinds of these treatments.

Examples of the layer formed by the degreasing treatment include a layer that is formed by acid degreasing, and alkali degreasing. Examples of the layer that is formed by the acid degreasing include a layer that is formed by a method using inorganic acids such as sulfuric acid, nitric acid, hydrochloric acid, and hydrofluoric acid alone, or a material obtained by mixing the inorganic acids, and the like. In addition, examples of the layer that is formed by the acid degreasing include a layer which has a degreasing effect of a metal foil and in which a passive metal fluoride is formed by using an acid degreasing agent obtained by dissolving a fluorine-containing compound such as sodium ammonium difluoride in the inorganic acids. The layer formed in this manner is effective from the viewpoint of having hydrofluoric acid resistance. Examples of the layer formed by the alkali degreasing include a layer that is formed by a method using sodium hydroxide.

Examples of the layer that is formed by the hydrothermal modification treatment include a layer that is formed by a boehmite treatment in which the metal foil is immersed in boiling water to which trimethanol amine is added.

Examples of the layer that is formed by the anodic oxidation treatment include a layer that is formed by anodized aluminum treatment.

Examples of the layer that is formed by the chemical treatment include layers that are formed by various chemical treatments such as a chromate treatment, a zirconium treatment, a titanium treatment, a vanadium treatment, a molybdenum treatment, a calcium phosphate treatment, a strontium hydroxide treatment, a cerium treatment, a ruthenium treatment, and a treatment in combination of these treatments.

It is preferable that the layer formed by the hydrothermal modification treatment, the anodic oxidation treatment, and the chemical treatment are a layer formed after being subjected to the above-described degreasing treatment in advance. In addition, the layer formed by the chemical treatment is not limited to a layer formed by a wet type, and may be a layer formed by an application type in which the treatment agent is mixed in a resin component.

Among the above-described layers, particularly, in the layer formed by the hydrothermal modification treatment or the anodic oxidation treatment, since a surface of the metal foil (aluminum foil) is dissolved depending on a treatment agent, and a compound excellent in corrosion resistance is formed, a co-continuous structure is formed from the metal foil layer to the anti-corrosion-treated layer. Accordingly, this treatment may be included in the definition of the chemical treatment in some cases. On the other hand, the anti-corrosion-treated layer 16 may be a layer formed by only a pure coating-type anti-corrosion treatment that is not included in the definition of the chemical treatment as described later.

Examples of the layer formed by this coating type anti-corrosion treatment include a layer that is formed by a method using a sol of rare-earth element-based oxide such as cerium oxide having an average particle size of 100 nm or less as a material which has a corrosion prevention effect (inhibitor effector) of the metal foil and which is also very suitable in an environmental aspect. When using the method, the anti-corrosion-treated layer 16 to which the corrosion prevention effect of the metal foil is applied may be formed even in a general coating method.

As the sol of the rare-earth element-based oxide such as cerium oxide, for example, various solvents such as a water-based sol, an alcohol-based sol, a hydrocarbon-based sol, a ketone-based sol, an ester-based sol, and an ether-based sol may be used, but it is preferable to use the water-based sol for the reason described to be later.

The oxide sol uses an inorganic acid such as nitric acid, hydrochloric acid, and phosphoric acid, and organic acid such as acetic acid, maleic acid, ascorbic acid, and lactic acid as a dispersion stabilizer to stabilize the dispersion of the oxide sol. Among the dispersion stabilizers, particularly, in the phosphoric acid, "improvement in adhesiveness with the metal foil" due to chelating ability, "providing electrolytic solution resistance" by trapping metal ions (formation of passivity) eluted due to an effect by the hydrofluoric acid, "improvement in a cohesive force of an oxide layer" due to ease of allowing dehydration condensation to occur even in a low temperature, and the like are expected. Examples of the phosphoric acid and a salt thereof include orthophosphoric acid, pyrophosphoric acid, metaphosphoric acid, and alkali metal salts and ammonium salts thereof. In addition, condensed phosphoric acid such as tri-metaphosphoric acid, tetra-metaphosphoric acid, hexa-metaphosphoric acid, ultra-metaphosphoric acid, and alkali metal salts and ammonium salts thereof are preferable materials for exhibiting a function as a packaging material. Particularly, when considering a drying and film formation property (drying capability and a quantity of heat) during formation of a layer formed from a rare-earth oxide by various coating methods using a sol of the rare-earth element oxide, it is preferable to use a treating agent excellent in reactivity at a low temperature. From this situation, a Na ion salt excellent in dehydration and condensation characteristics at a low temperature is preferably used. There is no particular restriction as the phosphate salt, and a water-soluble salt is preferable.

With regard to a mixing ratio of the cerium oxide and the phosphoric acid (or a salt thereof), it is preferable that phosphoric acid (or a salt thereof) be 1 part by mass or more with respect to 100 parts by mass of cerium oxide. When the content of the cerium oxide is less than 1 part by mass, there is a concern that stabilization of a sol is deficient and it is difficult to satisfy a function as a packaging material. More preferably, the mixed amount of phosphoric acid (or a salt thereof) is 5 parts by mass or more with respect to 100 parts by mass of cerium oxide. In addition, the upper limit of the mixing ratio of the phosphoric acid (or a salt thereof) may be in a range not accompanying a decrease in function of the cerium oxide sol, and it is preferable that the upper limit be 100 parts by mass or less with respect to 100 parts by mass of cerium oxide, more preferably 50 parts by mass or less, and still more preferably 20 parts by mass or less.

Since the layer that is formed from the above-described rare-earth element oxide sol is an aggregate of inorganic particles, even when the layer is subjected to a drying curing process, a cohesive force of the layer itself is low. Accordingly, it is preferable to carry out complexation using an anionic polymer so as to compensate for the cohesive force of the layer.

As the anionic polymer, a polymer having a carboxyl group may be exemplified. Specific examples of the anionic polymer include a copolymer that may be obtained by copolymerizing a monomer mixture containing poly(meth)acrylic acid (or a salt thereof), or (meth)acrylic acid as a main component. Examples of the monomer that is used in the monomer mixture in combination of the (meth)acrylic acid include alkyl (meth)acrylate-based monomers (examples of an alkyl group include a methyl group, an ethyl group, a n-propyl group, an i-propyl group, a n-butyl group, an i-butyl group, a t-butyl group, a 2-ethylhexyl group, a cyclohexyl group, and the like); amide group-containing monomers such as (meth)acryl amide, N-alkyl (meth)acryl amide, N,N-dialkyl (meth)acryl amide (examples of an alkyl group include a methyl group, an ethyl group, an n-propyl group, an i-propyl group, an n-butyl group, an i-butyl group, a t-butyl group, a 2-ethylhexyl group, a cyclohexyl group, and the like), N-alkoxy (meth)acrylamide, N,N-dialkoxy (meth)acrylamide (examples of an alkoxy group include a methoxy group, an ethoxy group, a butoxy group, an isobutoxy group, and the like), N-methylol (meth)acrylamide, and N-phenyl (meth)acrylamide; hydroxyl group-containing monomers such as 2-hydroxyethyl (meth)acrylate and 2-hydroxypropyl (meth)acrylate; glycidyl group-containing monomers such as glycidyl (meth) acrylate and allyl glycidyl ether; silane-containing monomers such as (meth)acryloxypropyltrimethoxysilane, (meth)acryloxypropyltriethoxysilane; isocyanate group-containing monomers such as (meth)acryloxypropyl isocyanate; and the like.

As described above, the anionic polymer is a material that is used to improve stability of an oxide layer that is obtained using the rare-earth element oxide sol. When using this material, an effect of protecting the hard and brittle oxide layer with the acrylic resin component may be obtained. In addition, an effect of trapping (cation catcher) ion contamination (particularly, sodium ions) that is derived from a phosphate contained in the rare-earth element oxide sol may be obtained. Without being limited to the usage of the lithium ion battery of this embodiment of the invention, for example, when ion contamination, particularly, alkali metal ions such as sodium or alkaline-earth metal ions are contained in the protective layer (anti-corrosion-treated layer) that is provided to prevent corrosion of the metal foil due to corrosive compounds, invasion of the protective layer occurs from the ion contamination as a starting point. That is, the anionic polymer such as polyacrylic acid is effective in consideration of improving resistance of the film by fixing the ion contamination such as sodium ions contained in the rare-earth element oxide sol.

As described above, when the anionic polymer as an anti-corrosion-treated layer is used in the packaging material in combination with the rare-earth element oxide sol, substantially the same corrosion prevention performance as that of a layer formed by a chromate treatment may be provided. The effect may be further improved by a cross-linking anionic polymer that is substantially water-soluble as described above.

The cross-linking of the anionic polymer may be carried out using a cross-linking agent, and examples of the cross-linking agent include a compound having an isocyanate group, a compound having a glycidyl group, a compound having a carboxyl group, and a compound having an oxazoline group.

Examples of the compound having an isocyanate group include diisocyanates such as tolylene diisocyanate, xylylene diisocyanate or a hydrogenated product thereof, hexamethylene diisocyanate, 4,4'-diphenylmethane diisocyanate or a hydrogenated product thereof, and isophorone diisocyanate; adducts obtained by reacting these isocyanates with polyhydric alcohols such as trimethylol propane; biuret products obtained by reacting these isocyanates with water; polyisocyanates of isocyanurate products or the like which are trimers; and blocked polyisocyanates obtained by conducting blocking reactions of these polyisocyanates with alcohols, lactams, oximes, or the like.

Examples of the compound having the glycidyl group include epoxy compounds obtained by allowing glycols such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, and neopentyl glycol, and epichlorohydrin to react with each other; epoxy compounds obtained by allowing polyhydric alcohols such as glycerin, polyglycerin, trimethylolpropane, pentaerythritol, and sorbitol, and epichlorohydrin to react with each other; dicarboxylic acids such as phthalic acid, terephthalic acid, oxalic acid, and adipic acid, and epichlorohydrin to react with each other; and the like.

Examples of the compounds having the carboxyl group include various aliphatic or aromatic dicarboxylic acids. In addition, poly(meth)acrylic acid or alkali(earth) metal salt of the poly(meth)acrylic acid may be used.

As the compound having the oxazoline group, low molecular weight compounds having two or more oxazoline units may be used. In addition, in a case of using polymerizable monomer such as isoprophenyl oxazoline, for example, compounds that are copolymerized with acrylic monomer such as (meth)acrylic acid, (meth)acrylic acid alkyl ester, and (meth)acrylic acid hydroxyalkyl may be used.

In addition, a cross-linking point may be set as a siloxane bond by using a silane coupling agent. Examples of the silane coupling agent include γ-glycidoxypropyltrimethoxysilane, γ-glycidoxy propyltriethoxy silane, β-(3,4-epoxy cyclohexyl)ethyltrimethoxy silane, γ-chloropropyltrimethoxysilane, vinyltrichlorosilane, γ-mercaptopropyl trimethoxy silane, γ-aminopropyltriethoxysilane, N-β (aminoethyl)-γ-aminopropyltrimethoxysilane, γ-isocyanatopropyltriethoxysilane, and the like. Among these, when considering reactivity with the anionic polymer, epoxysilane, aminosilane, and isocyanatesilane are preferable.

A mixed amount of the cross-linking agent is preferably 1 part by mass to 50 parts by mass with respect to 100 parts by mass of anionic polymer, and more preferably 10 parts by mass to 20 parts by mass. When the mixed amount of the cross-linking agent is equal to or more than the lower limit (1 part by mass), a cross-linking structure becomes sufficient. When the mixed amount of the cross-linking agent is equal to or less than the upper limit (50 parts by mass), a pot-life of a coating liquid becomes long.

As a method for cross-linking the anionic polymer, a method for carrying out ion cross-linking using titanium or zirconium compounds without limitation to the above-described cross-linking agent may be used.

In a case of forming the anti-corrosion-treated layer by the above-described coating type anti-corrosion treatment, differing from the chemical treatment represented by the chromate treatment, it is not necessary to form a graded structure between the metal foil layer and the anti-corrosion-treated layer. In the chemical treatment represented by the chromate treatment, as described above, the metal foil is subjected to a treatment particularly using a chemical treating agent in which hydrofluoric acid, hydrochloric acid, nitric acid, sulfuric acid, or a salt thereof react with chromium or a non-chromic compound so as to form the graded structure. However, the treating agent uses an acid, and is accompanied with corrosion of a working environment or a coating device.

On the other hand, in the anti-corrosion-treated layer that is formed by the above-described coating treatment, it is not necessary to form a graded structure with respect to the metal foil, and thus the property of a coating material may be acidic, alkaline, or neutral. Accordingly, the anti-corrosion-treated layer is working-environment friendly, and is effective as an alternative when considering environmental sanitation of the chromium compound used in the chromate treatment.

The anti-corrosion-treated layer 16 may have a multi-layered structure in which a coating layer using a cationic polymer and a cross-linking agent in combination is further laminated on the layer formed from the rare-earth element oxide sol or the composite layer of the rare-earth element oxide sol and the anionic polymer.

Examples of the cationic polymer include an ionic polymer complex composed of a polymer having ethylene imine, polyethylene imine, and carboxylic acid, primary amine graft acrylic resin in which primary amine is grafted in a main acrylic backborn, polyallylamine or a derivative thereof, aminophenol, and the like.

As the cross-linking agent, it is preferable to use a material having a functional group such as a carboxyl group and a glycidyl group which are capable of reacting with amine and imine. In addition, a polymer having carboxylic acid that forms an ionic polymer complex with polyethyleneimine may be used as the cross-linking agent. Examples of the cross-linking agent include polycarboxylic acid (polycarboxylate) such as polyacrylic acid and a salt thereof; a copolymer obtained by copolymerizing a comonomer in the polycarboxylic acid (polycarboxylate); polysaccharide such as carboxymethyl cellulose or a salt thereof.

As polyallylamine, a homopolymer or copolymer of allylamine, allyl amine amide sulfate, diallylamine, dimethylallylamine, and the like may be used. The amine may be used in a free amine, and in a stabilized product by acetic acid or hydrochloric acid. In addition, as a copolymer component, maleic acid, sulfur dioxide, and the like may be used. In addition, a type to which a thermal cross-linking property is provided by partially methoxylating primary amine may be used. Aminophenol may also be used. Among these, allyl amine or a derivative thereof is particularly preferable.

In addition, in this embodiment, it is described that the cationic polymer is one constituent element that makes up the anti-corrosion-treated layer. The reason for this is as follows. As a result of carrying out examination for providing electrolytic solution resistance and hydrofluoric acid resistance that are necessary for the packaging material by using various compounds, it has been found that the cationic polymer itself is a compound capable of providing electrolytic solution resistance and hydrofluoric resistance. The main cause of this is assumed as follows. Since fluorine ions are trapped by a cationic group (anion catcher), damage of the metal foil is suppressed. For this reason, in a case of using the rare-earth element oxide sol for the anti-corrosion-treated layer, the cationic polymer may be used instead of using the above-described anionic polymer for the protective layer.

Examples of the layer that is formed by the coating-type anti-corrosion treatment include, but are not limited to, the following layers:

(1) A layer that is formed by only the rare-earth element oxide sol, (2) A layer that is formed by only the anionic polymer, (3) A layer that is formed by only the cationic polymer, (4) A layer that is formed by the rare-earth element oxide sol and the anionic polymer (lamination complexation), (5) A layer that is formed by the rare-earth element oxide sol and the cationic polymer (lamination complexation), (6) A layer in which the layer formed by the cationic polymer is laminated on the layer formed by the rare-earth element oxide sol and the anionic polymer (lamination complexation), (7) A layer in which the layer formed by the anionic polymer is laminated on the layer formed by the rare-earth element oxide sol and the cationic polymer (lamination complexation), and the like.

The cationic polymer has a satisfactory adhesiveness with a modified polyolefin-based resin mentioned later in the description of the inner adhesive layer 17. Accordingly, in a case of forming the inner adhesive layer 17 with the modified polyolefin-based resin, an aspect (for example configuration (5) or (6)) in which the layer formed by the cationic polymer is provided at a position that comes into contact with the inner adhesive layer 17 is preferable.

For example, similar to the application-type chromate treatment that is a known technology, the anti-corrosion-treated layer 16 may be a layer which is formed using a treating agent obtained by mixing phosphoric acid and a chromium compound in a resin binder (aminophenol and the like), and which has both the corrosion prevention function and adhesiveness. In addition, the anti-corrosion-treated layer 16 may be a layer that is subjected to a complex treatment using the cationic polymer or the anionic polymer so as to improve adhesiveness of the anti-corrosion-treated layer 16 with respect to the above-described degreasing treatment, hydrothermal modification treatment, anodic oxidation treatment, chemical treatment, or chemical treatment in combination of these treatments. In addition, the anti-corrosion-treated layer 16 may be a layer in which the layer formed from the cationic polymer or the anionic polymer is laminated on the layer formed by the chemical treatment. In addition, the anti-corrosion-treated layer 16 may be a layer formed from a coating material that is obtained by one-liquefying the rare-earth element oxide sol and the cationic polymer or the anionic polymer in advance.

The thickness of the anti-corrosion-treated layer 16 is preferably in a range in which the mass per unit area is 0.005 g/m$^2$ to 0.200 g/m$^2$, and more preferably in a range in which the mass per unit is 0.010 g/m$^2$ to 0.100 g/m$^2$. When the thickness of the anti-corrosion-treated layer 16 is equal to or more than the lower limit (0.005 g/m$^2$), a sufficient corrosion prevention function may be obtained. In addition, even when the thickness of the anti-corrosion-treated layer 16 exceeds the upper limit (0.200 g/m$^2$), the corrosion prevention function is saturated and substantially does not vary. In addition, in a case of using the rare-earth element oxide sol, when the thickness of the anti-corrosion-treated layer 16 is equal to or less than the upper limit (0.200 g/m$^2$), curing has a tendency to sufficiently occur by heat during drying, and a cohesive force is not likely to decrease.

In addition, the thickness of the anti-corrosion-treated layer 16 is represented by mass per unit area, but may be converted into a thickness from a specific gravity.

The thickness of the anti-corrosion-treated layer 16 is preferably 0.025 μm to 0.2 μm considering the corrosion prevention function and a function as an anchor.

In the packaging material according to the embodiment of the invention, the anti-corrosion-treated layer may be provided at an outer side of the metal foil layer.

[Inner Adhesive Layer 17]

An adhesive component that constitutes the inner adhesive layer 17 is largely classified into two kinds including an adhesive component of a heat lamination configuration and an adhesive component of a dry lamination configuration.

As the adhesive component of the heat lamination configuration, an acid-modified polyolefin-based resin is preferable. Examples of the acid-modified polyolefin-based resin include the same resin mentioned in the thermoplastic resin layer (b). A maleic anhydride-modified polyolefin-based resin that is graft-modified with maleic anhydride is preferable. The acid-modified polyolefin-based resin provides adhesiveness using reactivity between a grafted unsaturated carboxylic acid derivative component and a polymer containing various metals or various functional groups.

In addition, a thermoplastic elastomer such as an acid-modified styrene-based elastomer may be dispersed in the acid-modified polyolefin-based resin according to desired characteristics. According to this, a residual stress occurring during lamination of the acid-modified polyolefin-based resin is released, and thus viscoelastic adhesiveness is improved. As the acid-modified styrene-based elastomer, a maleic anhydride-modified styrene-based elastomer that is graft-modified with a maleic anhydride is preferable. As the thermoplastic elastomer, TAFMER manufactured by Mitsui Chemicals, Inc., TAFCELENE manufactured by Sumitomo Chemical Co., Ltd., Zealous manufactured by Mitsubishi Chemical Corporation, Catalloy manufactured by Montel, Notio manufactured by Mitsui Chemicals, Inc., a styrene-based elastomer, and particularly, a hydrogenated styrene-based elastomer (TOUGH-TEK manufactured by AK Elastomer, Sefton/Hybra manufactured by KURARAY CO., LTD., Dynaron manufactured by JSR Corporation, Esporex manufactured by Sumitomo Chemical Co., Ltd., Kraton G manufactured by Kraton Performance Polymers Inc., and the like) are preferable.

For example, the inner adhesive layer 17 having the heat lamination configuration may be formed by extruding the above-described adhesive component by an extruder.

As the adhesive component having the dry lamination configuration, for example, the polyurethane-based adhesive mentioned in the outer adhesive layer 14 may be exemplified. However, since there is a concern of swelling due to the electrolytic solution or hydrolysis due to the hydrofluoric acid, it is necessary to carry out a composition design such as using a main agent having a backborn that is not likely to be hydrolyzed, and improving a cross-linking density.

As a method for improving the cross-linking density, for example, a method for using dimer fatty acid, ester of dimer fatty acid, a hydrogenated product of dimer fatty acid, or reduced glycol thereof is included. A bulky hydrophobic unit of the dimer fatty acid improves the cross-linking density as an adhesive. The dimer fatty acid is an acid obtained by dimerizing various unsaturated fatty acids, and examples of the structure thereof include a non-ring type, a mono-ring type, a multi-ring type, and an aromatic ring type.

Examples of the unsaturated fatty acid as a starting material of the dimer fatty acid include, but are not limited to, mono-unsaturated fatty acids, di-unsaturated fatty acid, tri-unsaturated fatty acid, tetra-unsaturated fatty acid, penta-unsaturated fatty acid, and hexa-unsaturated fatty acid. Examples of the mono-unsaturated fatty acid include crotonic acid, myristoleic acid, palmitoleic acid, oleic acid, elaidic acid, vaccenic acid, gadoleic acid, eicosenoic acid, erucic acid, nervonic acid, and the like. Examples of the di-unsaturated fatty acid include linoleic acid, eicosadienoic acid, docosadienoic acid, and the like. Examples of the tri-unsaturated fatty acid include linolenic acid, pinolenic acid, eleostearic acid, mead acid, dihomo-γ-linolenic acid, eicosatrienoic acid, and the like. Examples of the tetra-unsaturated fatty acid include stearidonic acid, arachidonic acid, eicosatetraenoic acid, adrenic acid, and the like. Examples of the penta-unsaturated fatty acid include bosseopentaenoic acid, eicosapentaenoic acid, Osbond acid, clupanodonic acid, tetracosahexaenoic acid, and the like. Examples of the hexa-unsaturated fatty acid include docosahexaenoic acid, Nisinic acid, and the like. A combination of the unsaturated fatty acid during dimerization of the unsaturated fatty acid may be any combination.

In addition, the dibasic acid mentioned in the polyester polyol may be introduced with the dimer fatty acid set as an essential component.

In addition, as a curing agent, it is effective to use at least one kind of polyisocyanate selected from the group consisting of crude tolylene diisocyanate, crude diphenylmethane diisocyanate, and polymeric diphenylmethane diisocyanate, or an adduct material thereof from the viewpoint of electrolytic solution resistance (particularly, solubility with respect to the electrolytic solution and a swelling property). Due to the curing agent, the cross-linking density of a coated adhesive film is improved, and this leads to improvement in solubility or swelling property and an increase in a concentration of urethane groups. Accordingly, an improvement in adhesiveness between the anti-corrosion-treated layer 16 and the sealant layer 18 is expected. In addition, it is preferable to use at least one kind of polyisocyanate selected from the group consisting of crude tolylene diisocyanate, crude diphenylmethane diisocyanate, and polymeric diphenylmethane diisocyanate, or an adduct material thereof as the chain extender.

With regard to the percentages of the main agent and the curing agent in the inner adhesive layer 17 having the dry laminate configuration, it is preferable that the curing agent be contained at 1 part by mass to 100 parts by mass with respect to 100 parts by mass of main agent, and more preferably 5 parts by mass to 50 parts by mass. When the percentage of the curing agent is equal to or more than the lower limit (1 part by mass), the adhesiveness and electrolytic solution resistance are excellent. When the percentage of the curing agent is equal to or less than the upper limit (100 parts by mass), an adverse effect on the adhesiveness or hardness due to residual unreacted curing agent may be easily suppressed.

In addition, the carbodiimide compound, the oxazoline compound, the epoxy compound, the phosphorus compound, the silane coupling agent, and the like which are in the outer adhesive layer 14 may be mixed in in the inner adhesive layer 17 having the dry laminate configuration.

In addition, various additives such as a flame retardant, a slipping agent, an anti-blocking agent, an oxidization-preventing agent, a photostabilizer, and a tackifier may be mixed in the inner adhesive layer 17.

[Sealant Layer 18]

The sealant layer 18 is a layer that provides sealing properties by heat-sealing in the packaging material 1.

As the sealant layer 18, films formed from a polyolefin-based resin, an ethylene-vinylacetate copolymer, an ethylene-(meth)acrylic acid copolymer, or esters or ionic cross-linked materials thereof may be exemplified.

Examples of the polyolefin-based resin include low-density, medium-density, or high-density polyethylene; an ethylene-α olefin copolymer; homo, block, or random polypropylene; a propylene-α olefin copolymer; and the like. These polyolefin-based resins may be used alone, or in combination of two or more kinds thereof.

The sealant layer 18 may be a film formed from one kind of resin, or a film formed from two or more kinds of resins. In addition, the sealant layer 18 may be a single layer film or a multi-layered film. This may be selected depending on a necessary function. For example, from the viewpoint of providing a moisture-proof property, a multi-layered film in which a resin such as an ethylene-cyclic olefin copolymer or polymethylpentene is interposed therebetween may be used. In addition, a multi-layered film in which a gas-barrier resin such as a partial or complete saponified product of ethylene-vinyl acetate copolymer and a partial or complete saponified product of polyvinyl acetate copolymer is interposed therebetween may be used.

In addition, various additives such as a flame retardant, a slipping agent, an anti-blocking agent, an oxidization-preventing agent, a photostabilizer, and a tackifier may be mixed in the sealant layer 18.

The thickness of the sealant layer 18 is preferably 10 μm to 100 μm, and more preferably 20 μm to 60 μm.

As a structure of the packaging material 1, from the viewpoint of improving adhesiveness, it is preferable to use a structure in which the sealant layer 18 is laminated on the anti-corrosion-treated layer 16 of the metal foil layer 15 by a sandwich lamination using an acid-modified polyolefin-based resin as an adhesive component that forms the inner adhesive layer 17.

[Manufacturing Method]

Hereinafter, a method for manufacturing the packaging material 1 will be described. However, the method for manufacturing the packaging material 1 is not limited to the following method. As the method for manufacturing the packaging material 1, for example, a method including the following processes (X1) to (X3) may be exemplified.

(X1) A process of forming the anti-corrosion-treated layer 16 on the metal foil layer 15.

(X2) A process of bonding the base material layer 10 to the metal foil layer 15 through the outer adhesive layer 14 on a side opposite to a side at which the anti-corrosion-treated layer 16 is formed.

(X3) A process of bonding the sealant layer 18 to the anti-corrosion-treated layer 16 of the metal foil layer 15 through the inner adhesive layer 17.

(Process (X1))

The anti-corrosion-treated layer 16 is formed on one surface of the metal foil layer 15 by carrying out a corrosion prevention treatment.

As the corrosion prevention treatment, the above-described degreasing treatment, hydrothermal modification treatment, anodic oxidation treatment, chemical treatment, coating of a coating material having a corrosion prevention performance, and the like may be used. With regard to the degreasing treatment, an annealing method, a spraying method, or an immersion method may be appropriately selected. With regard to the hydrothermal modification treatment and the anodic oxidation treatment, the immersion method may be appropriately selected. With regard to the chemical treatment, the immersion method, the spraying method, and a coating method, or the like may be appropriately selected according to a type of the chemical treatment. As a method for coating the coating material, various methods such as gravure coating, reverse coating, roll coating, and bar coating may be employed.

In a case where drying curing is necessary, the drying curing may be carried out in a range of 60° C. to 300° C. as a temperature of a mother material according to a kind of the anti-corrosion-treated layer 16.

(Process (X2))

Resin components that form the respective thermoplastic resin layers (a) to (c) are put into an extruder to obtain a multi-layered coextruded film by a coextrusion method, and then the multi-layered coextruded film is biaxially stretched and is set as a film (A). The thickness of the film (A) may be adjusted by stretching conditions such as a magnification and a temperature during stretching.

The film (A) is bonded to the metal foil layer 15 on a side opposite to a side at which the anti-corrosion-treated layer 16 is formed by a method such as dry lamination, non-solvent lamination, and wet lamination using an adhesive component that forms the outer adhesive layer 14, and the base material layer 10 is laminated on the film (A). The film (A) is bonded to the metal foil layer 15 so that the thermoplastic resin layer (c) is bonded to the metal foil layer 15 and the thermoplastic resin layer (a) is located at an outer side thereof.

A dry application amount of the adhesive is preferably 1 $g/m^2$ to 10 $g/m^2$, and more preferably 3 $g/m^2$ to 5 $g/m^2$.

In the process (X2), an aging (curing) treatment may be carried out in a range of room temperature to 100° C. to promote adhesivity.

In addition, in a case where the base material layer 10 is formed by a film having a four-layered configuration of the thermoplastic resin layer (a), the thermoplastic resin layer (b), the thermoplastic resin layer (c), and the thermoplastic resin layer (b) from the outer side thereof, the four layers may be laminated by various methods such as an extrusion sandwich lamination method and a heat lamination method using the thermoplastic resin layer (b) provided on an inner side thereof. As described above, as a method for laminating the base material layer 10 and the metal foil layer 15, various methods may be used.

(Process (X3))

The sealant layer 18 is bonded to and laminated on the anti-corrosion-treated layer 16 of a laminated body in which the base material layer 10, the outer adhesive layer 14, the metal foil layer 15, and the anti-corrosion-treated layer 16 are laminated in this order through the inner adhesive layer 17.

With regard to a method for laminating the sealant layer 18, in a case of a dry laminate configuration, dry lamination, non-solvent lamination, wet lamination, and the like may be exemplified. A dry application amount of the adhesive in this case is preferably 1 $g/m^2$ to 10 $g/m^2$, and more preferably 3 $g/m^2$ to 5 $g/m^2$. In addition, an aging (curing) treatment may be carried out in a range of room temperature to 100° C. to promote adhesivity.

In a case of a heat lamination configuration, the sandwich lamination method is preferable from the viewpoint that it is easy to make the inner adhesive layer 17 thicker in relation to coating, and sealant properties are improved.

In addition, the inner adhesive layer 17 and the sealant layer 18 may be formed in a film by coextrusion. In this case, it is preferable to carry out a heat treatment from the viewpoint of providing excellent electrolytic solution resistance and hydrofluoric acid resistance by further improving adhesiveness between the metal foil layer 15 and the sealant layer 18. In this case, a heat treatment temperature as a maximum arrival temperature of the laminated body is preferably in a range of room temperature to a temperature higher than the melting point of the sealant layer 18 by 20° C., more preferably in a range of the melting point of the inner adhesive layer 17 to the melting point of the sealant layer 18. A heat treatment time depends on the heat treatment temperature. Preferably, as the heat treatment temperature is lower, the heat treatment time is longer.

As a heat treatment method, from the viewpoints of productivity and handling, a method in which the laminated body is made to pass through a drying furnace or a baking furnace, a method using heat lamination (heat compression), and a method using a Yankee drum (included in a heat drum) are preferable.

The packaging material 1 may be obtained by the above-described processes (X1) to (X3).

In addition, the method for manufacturing the packaging material 1 is not limited to the method of sequentially carrying out the processes (X1) to (X3). For example, the process (X1) may be carried out after carrying out the process (X2). In addition, the anti-corrosion-treated layer may be provided on both surfaces of the metal foil layer.

In addition, a coating material obtained by dissolving a lubricant in a solvent may be applied to at least one of the base material layer 10 and the sealant layer 18 to make a coefficient of static friction small so as to further improve moldability. Examples of the lubricant include silicone, a polymer wax, fatty acid amide (erucic acid amide), and the like. In addition, the lubricant may be mixed in a film that forms the base material layer 10 or the sealant layer 18 in advance to allow the lubricant to precipitate by a bleed-out phenomenon.

Since the film (A) is used as the base material layer, the packaging material for a lithium ion battery according to the embodiment of the invention has excellent moldability, is excellent in a performance capable of maintaining a shape after molding by cold molding or the like, and is excellent in electrolytic solution resistance and scratch resistance.

In addition, the packaging material for a lithium ion battery according to the embodiment of the invention is not limited to the above-described packaging material 1. For example, the anti-corrosion-treated layer may be formed on both surfaces of the metal foil layer.

<Lithium Ion Battery>

Hereinafter, a lithium ion battery 100 as an example of the lithium ion battery according to the embodiment of the invention will be described with reference to FIG. 2.

Figure 2:
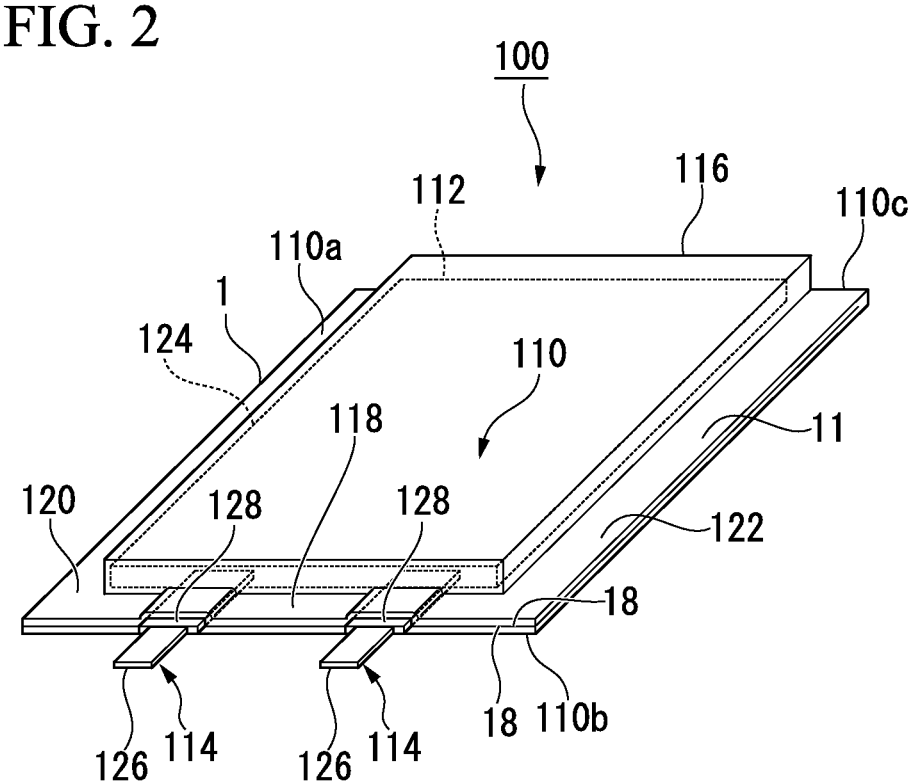
FIG. 2 is a perspective view illustrating an example of a lithium ion battery according to the embodiment of the invention.

As shown in FIG. 2, the lithium ion battery 100 includes a container body 110 formed by the packaging material 1, a battery member 112 that is accommodated in the container body 110 so that a part of a tab 114 leads out to the outside thereof, and an electrolytic solution (not shown) that is accommodated in the container body 110 together with the battery member 112.

The container body 110 includes a first container portion 110a and a second container portion 110b that are obtained by folding the rectangular packaging material 1 in half in order for the sealant layer 18 to be disposed inside the container body 110. A recess portion 116 that accommodates the battery member 112 is formed in the first container portion 110a by deep drawing to protrude from the sealant layer 18 toward the base material layer 10. According to this, the first container portion 110a has a container shape.

A front-end edge portion 118 is located at a portion opposite to a folded-back portion 110c between the first container portion 110a and the second container portion 110b. The front-end edge portion 118 is a strip-shaped edge portion at which parts of the sealant layer 18 come into contact with each other, and is heat-sealed in a state in which a part of the tab 114 is interposed therebetween. In addition, a first lateral edge portion 120 and a second lateral edge portion 122 which are strip-shaped edge portion located at both sides of the recess portion 116 are heat-sealed.

In this manner, in the container body 110, the three strip-shaped edge portions including the front-end edge portion 118, the first lateral edge portion 120, and the second lateral edge portion 122 form three sides in the rectangular lithium ion battery 100, respectively. When the three strip-shaped edge portions are heat-sealed, the battery member 112 is sealed inside the container body 110. In addition, the container body 110 is sealed in a state in which an electrolytic solution is accommodated inside the recess portion 116 together with the battery member 112.

The battery member 112 includes a battery member main body portion 124 having a positive electrode, a separator, and a negative electrode, and tabs 114 and 114 that are connected to the positive electrode and the negative electrode that are provided to the battery member main body portion 124, respectively.

A structure of the battery member main body portion 124 is not particularly limited as long as the structure is commonly used in a lithium ion battery, and for example, a laminated body in which the positive electrode, the separator, the negative electrode, and the separator are laminated in this order may be exemplified. As the positive electrode, the negative electrode, and the separator, a positive electrode, a negative electrode, and a separator that are commonly used in the lithium ion battery may be used without particular limitation.

The tabs 114 and 114 have leads 126 and 126 that are bonded to the positive electrode and the negative electrode, respectively, and tab sealants 128 and 128 that are wound around leads 126 and 126 and are welded to the sealant layer 18 of the front-end edge portion 118. The tabs 114 and 114 are provided in such a manner that base-end sides (base-end portions) of the leads 126 are bonded to the positive electrode and the negative electrode, respectively, and front-end sides (front-end portions) lead out to the outside of the container body 110.

Examples of a material of the leads 126 include aluminum, nickel, nickel-plated copper, and the like.

A material of the tab sealants 128 may be a material capable of being welded to the sealant layer 18 of the packaging material 1, and for example, the acid-modified polyolefin-based resin mentioned in the inner adhesive layer 17 of the packaging material 1 may be exemplified. In addition, the tab sealants 128 may have a multi-layered structure to provide insulation properties. For example, the tab sealants 128 may have a configuration (layer formed from an acid-modified polyolefin-based resin/heat-resistant base material layer/layer formed from an acid-modified polyolefin-based resin) in which the heat-resistant base material (polyester base material or the like) is interposed as an intermediate layer.

For example, the lithium ion battery 100 may be used in a PC, a portable terminal device such as a cellular phone, a video camera, a satellite, an electric vehicle, an electric motorcycle, an electric bike, and the like. As the lithium ion battery 100, a lithium ion battery that is used for these uses is particularly preferable.

(Method for Manufacturing Lithium Ion Battery)

The lithium ion battery according to the embodiment of the invention may be manufactured by a known method except that the packaging material for a lithium ion battery according to the embodiment of the invention is used. Hereinafter, an example of the method for manufacturing the lithium ion battery 100 will be described with reference to FIGS. 3A to 3C. As a method for manufacturing the lithium ion battery 100, a method including the following (Y1) to (Y3) may be exemplified.

(Y1) A process of preparing the packaging material 1, and forming the recess portion 116 at a portion that becomes the first container portion 110a in the packaging material 1 by cold molding.

(Y2) A process of accommodating the battery member 112 in the recess portion 116 so that a part of each of the tabs 114 leads out to the outside of the recess portion 116, folding back a portion that becomes the second container portion 110b of the packaging material 1 to form the packaging material 1 in a container shape, and heat-sealing the front-end edge portion 118 and the first lateral edge portion 120.

(Y3) A process of injecting an electrolytic solution into the recess portion 116 from the opening provided to the second lateral edge portion 122, and sealing the second lateral edge portion 122 by heat-sealing to close the opening.

(Process (Y1))

Figure 3A:
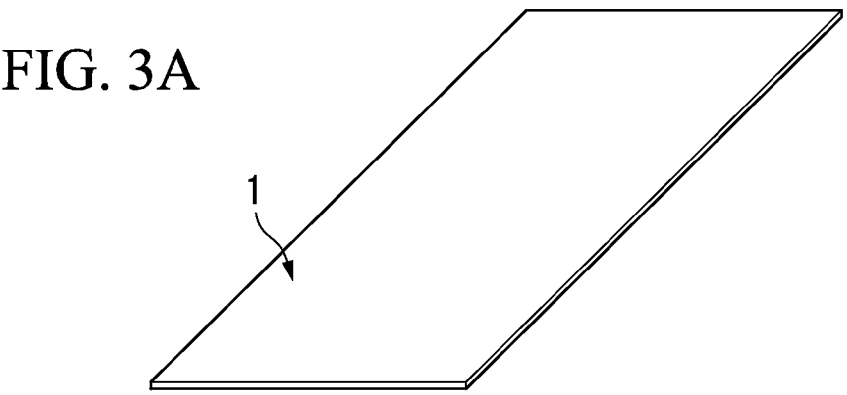
FIG. 3A is a perspective view illustrating a manufacturing process of the lithium ion battery of FIG. 2.

First, as shown in FIG. 3A, the packaging material 1 having a rectangular shape is prepared. Then, the rectangular packaging material 1 is molded by deep-drawing to have a desired molding depth from the sealant layer 18 of the packaging material 1 toward the base material layer 10 using a mold, thereby forming the recess portion 116 at the portion that becomes the first container portion 110a.

As the mold, a mold that is commonly used in deep-drawing molding may be used. For example, when a coefficient of friction of the surface of the packaging material 1 is made to be low by using a lubricant during the deep-drawing molding, friction between the mold and the packaging material 1 decreases. According to this, the packaging material 1 easily flows to a molded portion from a film-pressing portion of the mold. According to this, a relatively deeper recess portion 116 may be formed without causing cracking or pinhole.

(Process (Y2))

Figure 3B:
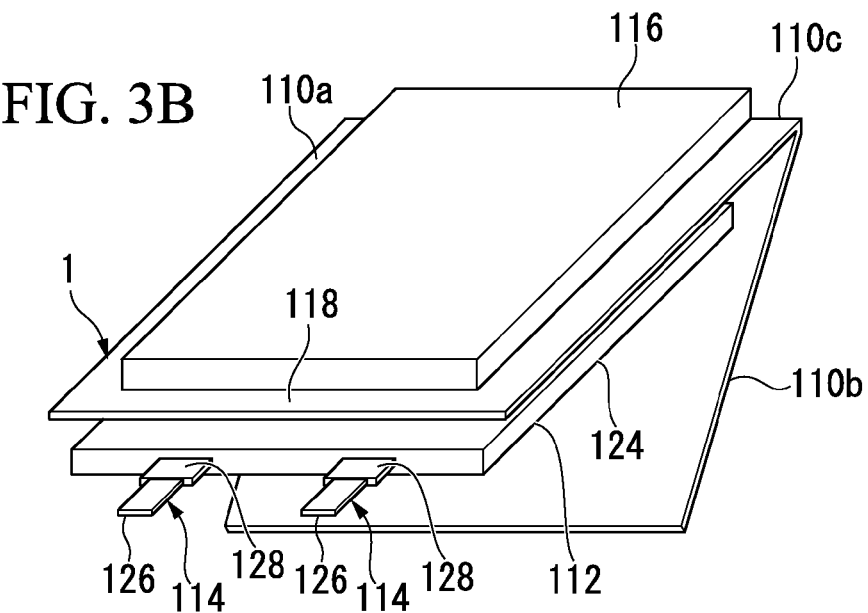
FIG. 3B is a perspective view illustrating a manufacturing process of the lithium ion battery of FIG. 2.
Figure 3C:
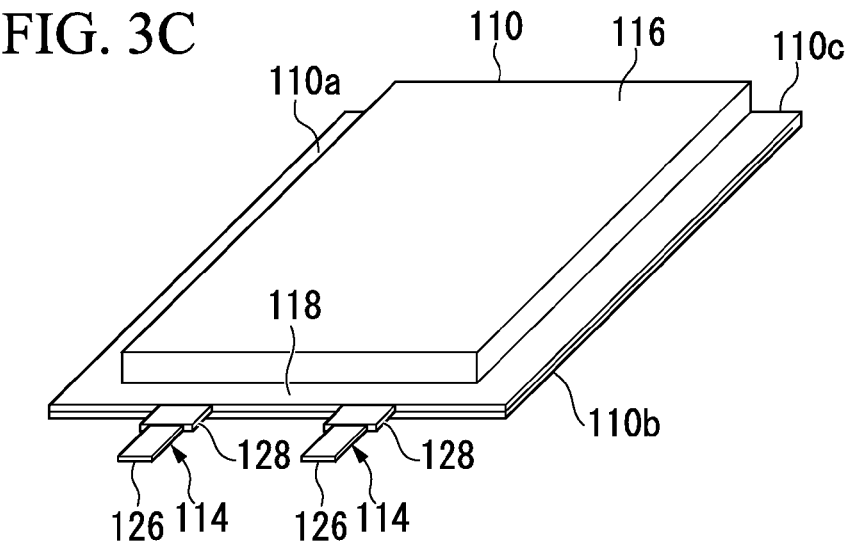
FIG. 3C is a perspective view illustrating a manufacturing process of the lithium ion battery of FIG. 2.

Next, as shown in FIG. 3B, the battery member 112 is disposed inside the recess portion 116 formed in the process (Y1), and the portion that becomes the second container portion 110b of the packaging material 1 is folded back. The tabs 114 are interposed in the front-end edge portion 118 located at a side opposite to the folded-back portion 110c so that a part of each of the tabs 114 leads out to the outside of the recess portion 116, and then the front-end edge portion 118 is heat-sealed. At this time, the tab sealant 128 of the tab 114 is welded to both of the sealant layers 18 provided to the first container portion 110a and the sealant layer 18 provided to the second container portion 110b in the packaging material 1. Furthermore, the first lateral edge portion 120 is also heat-sealed, and thus the packaging material 1 is formed in a container shape having an opening provided to the second lateral edge portion 122.

In the heat-sealing method, a status of the packaging material 1 having a container shape may be controlled by adjusting three conditions including a temperature of a heat-sealing bar, a surface pressure during sealing, and a sealing time.

(Process (Y3))

After injecting an electrolytic solution into the recess portion 116 from the opening provided in the second lateral edge portion 122, the inside of the recess portion 116 is made to be a vacuum state to extract a gas. In addition, the second lateral edge portion 122 which is not heat-sealed and in which the opening is provided is heat-sealed under vacuum to seal the second lateral edge portion 122, thereby obtaining the lithium ion battery 100 (refer to FIG. 3C).

The lithium ion battery 100 may be obtained by the above-described processes (Y1) to (Y3).

In addition, the method for manufacturing the lithium ion battery 100 is not limited to the above-described method. For example, first, the second lateral edge portion 122 may be heat-sealed, the electrolytic solution may be injected into the recess portion 116 through an opening provided on the first lateral edge portion 120 side thereof, and the first lateral edge portion 120 may be sealed to close the opening by heat-sealing.

As described above, since the lithium ion battery according to the embodiment of the invention uses the packaging material for a lithium ion battery according to the embodiment of the invention, a relatively deeper recess portion may be formed, and the lithium ion battery has excellent electrolytic solution resistance and scratch resistance.

In addition, the lithium ion battery according to the embodiment of the invention is not limited to the above-described lithium ion battery 100. For example, the invention may be applied to an all-direction sealing type lithium ion battery 100 that is manufactured by the following manufacturing method. In this case, a recess portion is formed in a part of the packaging material for a lithium ion battery according to the invention by cold molding. Then, a battery member having a positive electrode, a separator, a negative electrode, and a tab is disposed inside the recess portion. Then, one sheet of the packaging material for a lithium ion battery according to the invention is bonded to the packaging material for a lithium ion battery in which the recess portion is formed so that sealant layers are opposite to each other. Furthermore, lateral edge portions of three sides of the packaging material for a lithium ion battery are heat-sealed. Then, the electrolytic solution is injected in a vacuum state through one side in which an opening is provided. After the injection of the electrolytic solution is terminated, a lateral edge portion of the one side in which the opening is provided is sealed by heat-sealing.

EXAMPLES

Hereinafter, the invention will be described in detail with reference to examples, but the invention is not limited to the following description.

<Used Material>

Materials used in the examples are as follows.

[Base Material Layer]

Table 1 shows a layer configuration of films A-1 to A-11 that were used in the base material layer. The films A-1 to A-11 were manufactured by biaxially stretching a multi-layered coextruded film formed by coextruding resins that form the thermoplastic resin layers (a) to (c).

In addition, symbols in Table 1 represent the following meanings.

PET: Polyethylene terephthalate b-1: Polypropylene-based resin that was graft-modified with maleic anhydride.

b-2: Styrene-based elastomer that was graft-modified with maleic anhydride b-3: Polyester-based elastomer that was graft-modified with maleic anhydride Ny-6: Nylon 6

TABLE 1

| Film | Thermoplastic resin layer (a) | | Thermoplastic resin layer (b) | | Thermoplastic resin layer (c) | |
|---|---|---|---|---|---|---|
| | material | thickness [μm] | material | thickness [μm] | material | thickness [μm] |
| A-1 | PET | 5 | b-1 | 0.5 | Ny-6 | 25 |
| A-2 | PET | 5 | b-1 | 1 | Ny-6 | 25 |
| A-3 | PET | 5 | b-1 | 5 | Ny-6 | 25 |
| A-4 | PET | 5 | b-1 | 10 | Ny-6 | 25 |
| A-5 | PET | 12 | b-1 | 1 | Ny-6 | 15 |
| A-6 | PET | 12 | b-1 | 3 | Ny-6 | 15 |
| A-7 | PET | 0.5 | b-1 | 1 | Ny-6 | 25 |
| A-8 | PET | 5 | b-1 | 1 | Ny-6 | 35 |
| A-9 | PET | 5 | b-1 | 1 | Ny-6 | 15 |
| A-10 | PET | 5 | b-2 | 1 | Ny-6 | 25 |
| A-11 | PET | 5 | b-3 | 1 | Ny-6 | 25 |

In addition, films B-1 to B-5 that were used as comparative objects are shown below.

Film B-1: A film (the same as the film A-1 except that the thermoplastic resin layer (b) was not provided) obtained by biaxially stretching a multi-layered coextruded film having a two-layered configuration of PET (thickness: 5 μm) and Ny-6 (thickness: 25 μm).

Film B-2: A laminated film obtained by bonding a biaxially stretched PET film having a thickness of 5 μm and a biaxially stretched Ny film having a thickness of 25 μm with a polyurethane-based adhesive (product name: "TM-K55/CAT-10L", manufactured by TOYO INK CO., LTD (thickness: 1 μm).

Film B-3: The same laminated film as the film B-2 except that the thickness of the adhesive layer by a polyurethane-based adhesive was 5 μm.

Film B-4: A laminated film obtained by bonding a biaxially stretched PET film having a thickness of 12 μm and a biaxially stretched Ny film having a thickness of 15 μm with a polyurethane-based adhesive (product name: "TM-K55/CAT-10L", manufactured by TOYO INK CO., LTD (thickness: 1 μm).

Film B-5: The same laminated film as the film B-4 except that the thickness of the adhesive layer by a polyurethane-based adhesive was 3 μm.

[Outer Adhesive Layer 14]

Adhesive C-1: A polyurethane-based adhesive (product name: "TM-K55/CAT-10L", manufactured by TOYO INK CO., LTD) in which a tolylene diisocyanate adduct-based curing agent was mixed in a polyester polyol-based main agent.

[Metal Foil Layer 15]

Metal foil D-1: Formed from soft aluminum foil 8079 (manufactured by TOYO ALUMINIUM K.K., thickness: 40 μm).

[Anti-Corrosion-treated Layer 16]

Treating agent E-1: "Sodium polyphosphate-stabilized cerium oxide sol" in which a concentration of a solid content was adjusted to 10% by mass using distilled water as a solvent. The content of the phosphate was 10 parts by mass with respect to 100 parts by mass of the cerium oxide.

Treating agent E-2: A treating agent containing 90% by mass of "ammonium polyacrylate (manufactured by TOAGOSEI CO., LTD.)" in which a concentration of a solid content was adjusted to 5% by mass using distilled water as a solvent, and 10% by mass of "acryl-isopropenyl oxazoline copolymer (manufactured by NIPPON SHOKUBAI CO., LTD.)".

Treating agent E-3: A treating agent containing 90% by mass of "polyallylamine (manufactured by Nitto Boseki Co., Ltd.) in which a concentration of a solid content was adjusted to 5% by mass using distilled water as a solvent, and 10% by mass of "polyglycerol polyglycidyl ether (manufactured by Nagase ChemteX Corporation)".

Treating agent E-4: A treating agent in which chromium fluoride ($CrF_3$) was adjusted to have a concentration of 10 $mg/m^2$ in terms of an amount of Cr present in an ultimately dried film with respect to a water-soluble phenol resin (manufactured by SYMITOMO BAKELITE CO., LTD) in which a concentration of a solid content was adjusted to 1% by mass using an aqueous phosphoric acid solution having a concentration of 1% by mass as a solvent.

[Inner Adhesive layer 17]

Adhesive F-1: A polyurethane-based adhesive in which a main agent was polyester polyol (product name: "TAKELAC", manufactured by Mitsui Chemicals, Inc.) formed from hydrogenated dimer patty acid and diol, and a curing agent was a mixture of crude tolylene diisocyanate and crude (or polymeric) diphenylmethane diisocyanate, or an adduct thereof (product name: "TAKENATE", manufactured by Mitsui Chemicals, Inc.).

Adhesive F-2: Acid-modified polyolefin-based resin (product name: "Admer", manufactured by Mitsui Chemicals, Inc.) obtained by mixing an elastomer formed from ethylene-α-olefin copolymer in modified PP in which maleic anhydride was graft-modified with respect to random polypropylene (Tm (AR)=approximately 135° C.).

[Sealant Layer 18]

Film G-1: A multi-layered film of two kinds and three layers of random propylene/block propylene/random propylene (thickness 60 µm, manufactured by OKAMOTO).

Film G-2: A multi-layered film of two kinds and three layers of random propylene/block propylene/random propylene (thickness 80 µm, manufactured by OKAMOTO).

[Preparation of Packaging Material for Lithium Ion Battery]

The treating agents E-1 to E-4 were applied onto one surface of the metal foil D-1, which becomes the metal foil layer 15, in configurations shown in Table 2 by micro gravure coating, and were dried to form the anti-corrosion-treated layer 16. An application amount of the treating agents was set to be 70 $mg/m^2$ to 100 $mg/m^2$ in terms of an ultimate dry application amount. With respect to a case in which the anti-corrosion-treated layer 16 has a multi-layered configuration, the applied amount of the treating agents was also set to 70 $mg/m^2$ to 100 $mg/m^2$ in terms of an ultimate dry application amount. Then, the resultant dried unit was subjected to a baking treatment at 150° C. to 250° C. according to a type of a coating material in a drying unit.

Subsequently, the adhesive C-1 was applied onto the metal foil layer 15 on a surface opposite to the anti-corrosion-treated layer 16 by gravure reverse coating in a dry application amount of 4 $g/m^2$ to 5 $g/m^2$, and a film that constitutes the base material layer 10 was bonded thereto by a dry lamination method. In the films A-1 to A-11, and the film B-1, the thermoplastic resin layer (c) was set to face the metal foil layer 15 side. In the films B-2 to B-5, the biaxially stretched Ny film was set to face the metal foil layer 15 side. Then, aging was carried out at 60° C. for six days.

Next, the sealant layer 18 was laminated on the anti-corrosion-treated layer 16 of the laminated body that was obtained through the inner adhesive layer 17.

With regard to a heat lamination configuration, the adhesive F-2 was extruded onto the anti-corrosion-treated layer 16 of the laminated body that was obtained by a laminating machine at 260° C. to 300° C. to have a thickness of 20 µm, and the film G-1 was bonded thereto by sandwich lamination. Then, the resultant laminated body was heated and compressed under conditions of 160° C., 4 $kg/cm^2$, and 2 m/minutes to prepare the packaging material.

With regard to a dry lamination configuration, the adhesive F-1 was applied onto the anti-corrosion-treated layer 16 of the laminated body that was obtained by gravure reverse coating in a dry application amount of 4 $g/m^2$ to 5 $g/m^2$, and the film G-2 was bonded thereto by a dry lamination method. Then, aging was carried out at 60° C. for six days.

Evaluation was carried out with respect to moldability, a rebounding property, a curling property, electrolytic solution resistance, and scratch resistance.

As the evaluation of the moldability, a deep-drawing depth was measured, and it was determined how deep a recess portion may be formed by cold molding. In the recess portion after molding, it is important that a pinhole not be present, and a locally thin portion or rupture not be present at a corner portion of the recess portion. Specifically, it is preferable that the thickness of the metal foil layer at a portion that becomes thin by the cold molding be 60% or more than the thickness of the original metal foil layer. Particularly, in a recess portion for an electric vehicle, the thickness at the corner portion has a great effect on the reliability of a battery.

As the evaluation of the rebounding property, an actual deep-drawing depth with respect to a predetermined deep-drawing depth was measured, and it was determined whether or not criteria were satisfied. When the respective thermoplastic resin layers of the base material layer in the packaging material are cold-molded at a plastic deformation region, the actual deep-drawing depth is close to the predetermined deep-drawing depth.

As the evaluation of the curling property, an angle (described later) in an installation surface was measured, and it was determined whether or not a warpage amount of a portion other than the recess portion when the recess portion was formed by the cold molding satisfied criteria. When the respective thermoplastic resin layers of the base material layer in the packaging material are cold-molded at a plastic deformation region, a stress during molding is not likely to remain in the respective thermoplastic resin layers of the base material layer, and the amount of warpage decreases. When the warpage of the packaging material is small, seal failure is not likely to occur while sealing the edge portion by heat sealing, and handleability becomes excellent.

[Evaluation of Moldability]

The packaging materials that were obtained in the above-described examples were cut in a blank shape of 150 mm×190 mm, and a recess portion was formed at the central portion thereof by cold molding. As a punch, a punch having dimensions of 100 mm×150 mm, a punch corner R (RCP) of 1.5 mm, a punch shoulder R (RP) of 0.75 mm, and a die shoulder R (RD) of 0.75 mm was used. A mold closing pressure (air cylinder) was 0.5 MPa to 0.8 MPa, and a stroke speed was 5 mm/second.

Evaluation was carried out as follows. The deep-drawing depth was increased by 1 mm from 4 mm, and the cold molding at the same deep-drawing depth was carried out 10 times, and it was confirmed whether or not the pinhole and rupture were present with respect to each sample. Evaluation criteria were set as follows. "A" or higher was regarded as "pass".

"O": Cold molding with deep-drawing depth of 8 mm or more was possible without causing the pinhole or rupture.

"Δ": Cold molding with deep-drawing depth of 7 mm or less was possible without causing the pinhole or rupture.

"x": Cold molding with deep-drawing depth exceeding 5 mm was impossible without causing the pinhole or rupture.

[Evaluation of Rebounding Property]

With respect to samples which were obtained in the evaluation of the moldability and which had a deep-drawing depth of 5 mm, a distance (substantial molding depth) from the bottom to the top of the recess portion was measured with vernier calipers, and a difference from 5 mm that was the set molding depth was set as an amount of rebounding. The evaluation was carried out according to the following criteria. "Δ" or higher was regarded as "pass".

"O": The amount of rebounding was less than 0.3 mm

"Δ": The amount of rebounding was equal to or more than 0.3 mm and less than 0.8 mm "x": The amount of rebounding was 0.8 mm or more.

[Evaluation of Curling Property]

With respect to packaging materials that were obtained in respective examples, a recess portion 210 (FIG. 4) was formed by cold molding in a single-side region (region of 100 mm×120 mm) of a sample 200 (FIG. 4) that was cut into a blank shape of 200 mm×120 mm. As a punch, a punch having dimensions of 70 mm×80 mm, a punch corner R (RCP) of 1 mm, a punch shoulder R (RP) of 1 mm, and a die shoulder R (RD) of 1 mm was used. A mold closing pressure (air cylinder) was 0.5 MPa to 0.8 MPa, and a stroke speed was 5 mm/second.

Figure 4:
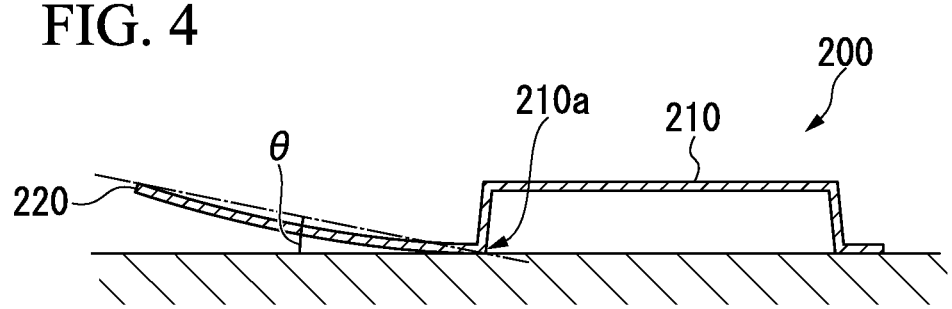
FIG. 4 is a cross-sectional view illustrating a method for evaluating a curling property.

As shown in FIG. 4, the sample 200 was placed in such a manner that the bottom portion of the recess portion 210 faced an upper side, and an angle θ made by a straight line connecting an end 220 in which the recess portion 210 was not formed and a portion 210a of the installation surface with which an edge of the recess portion 210 came into contact, and the installation surface was measured. The evaluation of the curling property was carried out according to the following criteria. "A" or higher was regarded as "pass".

"O": Angle θ was less than 13°.

"Δ": Angle θ was equal to or more than 13° and less than 30°.

"x": Angle θ was more than 30°

[Evaluation of Electrolytic Solution Resistance and Scratch Resistance]

The surface of the base material layer of each of the packaging materials that were obtained in the examples was scratched with a steel wool (#0000), to which a load of 250 g was applied, 50 times. Then, several drops of an electrolytic solution ($LiPF_6$ (lithium hexafluorophosphate) was dissolved in ethylene carbonate/dimethyl carbonate/diethyl carbonate=1/1/1 (mass ratio) after carrying out adjustment in such a manner that $LiPF_6$ became 1.5 M with respect to the solvent. Then, water corresponding to 1500 mass ppm was added to the electrolytic solution to generate hydrofluoric acid) was dropped to the surface of the base material layer, and the base material was left under an environment of 25° C. and 95% RH for 24 hours. Then, the electrolytic solution was wiped up, and deterioration of the surface of the base material layer was confirmed with the naked eye. Evaluation was carried out according to the following criteria.

"O": Adhesion trace of the electrolytic solution to the portion on the surface of the base material layer which was scratched with the steel wool and deterioration of the surface were not found.

"Δ": Adhesion trace of the electrolytic solution to the portion on the surface of the base material layer which was scratched with the steel wool was found, but deterioration was not found.

"x": Deterioration of the portion on the surface of the base material layer which was scratched with the steel wool was found.

Examples 1 to 13 and Comparative Examples 1 to 5

Packaging materials having configurations shown in FIG. 2 were prepared according to the preparation method. Evaluation results about the moldability, the rebounding property, the curling property, the electrolytic solution resistance, and the scratch resistance are shown in Table 2.

TABLE 2

| | Configurations of a packaging material | | | | | | Moldability | | Rebounding Property | | Curling Property | | Electrolytic Solution Resistance and Scratch Resistance |
|---|---|---|---|---|---|---|---|---|---|---|---|---|---|
| | | Outer adhesive layer 14 | Metal foil layer 15 | Anti-corrosion-treated layer 16 | Inner adhesive layer 17 | | Maximum deep-drawing depth [mm] | | | | | | |
| | Base material layer 10 | | | | | Sealant layer 18 | | Evaluation | Amount of Rebounding [mm] | Evaluation | Angle θ [degrees] | Evaluation | |
| Example 1 | A-1 | C-1 | D-1 | E-1/E-2/E-3 | F-2 | G-1 | 9 | O | 0.2 | O | 10 | O | O |
| Example 2 | A-2 | C-1 | D-1 | E-1/E-2/E-3 | F-2 | G-1 | 9 | O | 0.2 | O | 10 | O | O |
| Example 3 | A-3 | C-1 | D-1 | E-1/E-2/E-3 | F-2 | G-1 | 9 | O | 0.2 | O | 10 | O | O |
| Example 4 | A-4 | C-1 | D-1 | E-1/E-2/E-3 | F-2 | G-1 | 9 | O | 0.2 | O | 10 | O | O |
| Example 5 | A-5 | C-1 | D-1 | E-1/E-2/E-3 | F-2 | G-1 | 7 | Δ | 0.5 | Δ | 20 | Δ | O |
| Example 6 | A-6 | C-1 | D-1 | E-1/E-2/E-3 | F-2 | G-1 | 7 | Δ | 0.5 | Δ | 20 | Δ | O |
| Example 7 | A-7 | C-1 | D-1 | E-1/E-2/E-3 | F-2 | G-1 | 8 | O | 0.2 | O | 10 | O | Δ |
| Example 8 | A-8 | C-1 | D-1 | E-1/E-2/E-3 | F-2 | G-1 | 9 | O | 0.2 | O | 10 | O | O |

TABLE 2-continued

| | Configurations of a packaging material | | | | | | Moldability | | | | | | Electrolytic |
|---|---|---|---|---|---|---|---|---|---|---|---|---|---|
| | | Outer | Metal | Anti-corrosion- | Inner | | Maximum deep-drawing | | Rebounding Property | | Curling Property | | Solution |
| | Base material layer 10 | adhesive layer 14 | foil layer 15 | treated layer 16 | adhesive layer 17 | Sealant layer 18 | depth [mm] | Evaluation | Amount of Rebounding [mm] | Evaluation | Angle θ [degrees] | Evaluation | Resistance and Scratch Resistance |
| Example 9 | A-9 | C-1 | D-1 | E-1/E-2/E-3 | F-2 | G-1 | 7 | Δ | 0.5 | Δ | 20 | Δ | ○ |
| Example 10 | A-10 | C-1 | D-1 | E-1/E-2/E-3 | F-2 | G-1 | 9 | ○ | 0.2 | ○ | 10 | ○ | ○ |
| Example 11 | A-11 | C-1 | D-1 | E-1/E-2/E-3 | F-2 | G-1 | 9 | ○ | 0.2 | ○ | 10 | ○ | ○ |
| Example 12 | A-2 | C-1 | D-1 | E-1/E-2/E-3 | F-1 | G-2 | 9 | ○ | 0.2 | ○ | 10 | ○ | ○ |
| Example 13 | A-2 | C-1 | D-1 | E-4 | F-2 | G-1 | 9 | ○ | 0.2 | ○ | 10 | ○ | ○ |
| Comparative Example 1 | B-1 | C-1 | D-1 | E-1/E-2/E-3 | F-2 | G-1 | — | x | — | — | — | — | ○ |
| Comparative Example 2 | B-2 | C-1 | D-1 | E-1/E-2/E-3 | F-2 | G-1 | 7 | Δ | 1.5 | x | 80 | x | ○ |
| Comparative Example 3 | B-3 | C-1 | D-1 | E-1/E-2/E-3 | F-2 | G-1 | 7 | Δ | 1.5 | x | 80 | x | ○ |
| Comparative Example 4 | B-4 | C-1 | D-1 | E-1/E-2/E-3 | F-2 | G-1 | 6 | Δ | 1.5 | x | 80 | x | ○ |
| Comparative Example 5 | B-5 | C-1 | D-1 | E-1/E-2/E-3 | F-2 | G-1 | 6 | Δ | 1.5 | x | 80 | x | ○ |

As shown in Table 2, in Examples 1 to 13 in which the film (A) obtained by biaxially stretching a multi-layered coextruded film having the thermoplastic resin layer (a), the thermoplastic resin layer (b), and the thermoplastic resin layer (c) from an outer side was used as the base material layer, all of the moldability, the rebounding property, the curling property, the electrolytic solution resistance, and the scratch resistance were excellent. In addition, in Examples 1 to 12, excellent electrolytic solution resistance was obtained without performing the chromate treatment, and thus it is effective even if restrictions with respect to chromium compounds are enforced in the future On the other hand, in Comparative Example 1 in which a film obtained by biaxially stretching a multi-layered coextruded film not having the thermoplastic resin layer (b) was used, cold molding could not be carried out, and moldability significantly decreased. In addition, in Comparative Examples 2 to 5 in which a biaxially stretched PET film and a biaxially stretched Ny film were bonded to each other by a dry lamination method, the rebounding property and the curling property were poor.

The packaging material for a lithium ion battery according to the invention may be formed in a deep-drawing depth by cold molding without accompanying occurrence of cracking or a pinhole. In addition, since the packaging material for a lithium ion battery according to the invention is excellent in performance capable of maintaining a shape after molding, and excellent in electrolytic solution resistance and scratch resistance, the packaging material may be appropriately used where long-term reliability and safety are required. Particularly, the packaging material for a lithium ion battery of the invention is effective for usage in an electric vehicle or the like in which it is necessary to take out a large current.

What is claimed is:
1. A packaging material for a lithium ion battery, the packaging material comprising:
a base material layer that is formed from a film obtained by biaxially stretching a multi-layered coextruded film including
a first thermoplastic resin layer having rigidity and chemical resistance, being disposed at an outer side of the multi-layered coextruded film, and being a layer containing an aromatic polyester resin,
a second thermoplastic resin layer having a capability of propagating stress and adhesiveness, and being a layer containing a modified thermoplastic resin that is graft-modified with one or more unsaturated carboxylic acid derivative components selected from the group consisting of unsaturated carboxylic acid, acid anhydride of the unsaturated carboxylic acid, and ester of the unsaturated carboxylic acid, and
a third thermoplastic resin layer having toughness and being a layer containing a polyamide resin;
a metal foil layer that is laminated on one surface of the base material layer;
an anti-corrosion-treated layer that is laminated on the metal foil layer;
an inner adhesive layer that is laminated on the anti-corrosion-treated layer; and
a sealant layer that is laminated on the inner adhesive layer.

2. The packaging material for a lithium ion battery according to claim 1,
wherein a thickness of the first thermoplastic resin layer is 1 μm to 10 μm,
a thickness of the second thermoplastic resin layer is 0.1 μm to 5 μm, and
a thickness of the third thermoplastic resin layer is 10 μm to 50 μm.

3. The packaging material for a lithium ion battery according to claim 1,
wherein the first thermoplastic resin layer is disposed at a surface layer side of the base material layer.

4. A lithium ion battery, comprising:
a container body that is formed from the packaging material for a lithium ion battery according to claim 1;
a battery member that is accommodated in the container body so that a part of a tab leads out to the outside; and
an electrolytic solution that is accommodated in the container body together with the battery member,
wherein the container body has a recess portion that is formed in the packaging material for a lithium ion battery by cold molding,
the container body is formed in a container shape in which the sealant layer is disposed inside the container body, and
an edge portion at which parts of the sealant layer come into contact with each other is heat-sealed in a state in which the battery member and the electrolytic solution are accommodated in the recess portion to seal the battery member and the electrolytic solution.

5. A method for manufacturing a lithium ion battery, the method comprising:
preparing the packaging material for a lithium ion battery according to claim 1;
forming a recess portion in the packaging material for a lithium ion battery by cold molding;
accommodating a battery member in the recess portion so that a part of a tab leads out to the outside of the recess portion;
forming the packaging material for a lithium ion battery in a container shape, and heat-sealing an edge portion at which parts of the sealant layer come into contact with each other so that an opening is formed at the edge portion;
injecting an electrolytic solution into the recess portion through the opening; and
heat-sealing the edge portion to close the opening.

* * * * *